United States Patent [19]

Findlan

[11] Patent Number: 5,977,513
[45] Date of Patent: Nov. 2, 1999

[54] APPARATUS AND METHOD FOR CENTERING A LASER WELDING PROBE WITHIN A TUBE USING GAS PRESSURE

[75] Inventor: Shane Joseph Findlan, Harrisburg, N.C.

[73] Assignee: Electric Power Research Institute, Inc., Palo Alto, Calif.

[21] Appl. No.: 08/810,691

[22] Filed: Feb. 28, 1997

Related U.S. Application Data

[63] Continuation-in-part of application No. 08/410,714, Mar. 27, 1995, Pat. No. 5,653,897, which is a continuation-in-part of application No. 08/192,556, Feb. 7, 1994, Pat. No. 5,514,849, which is a continuation-in-part of application No. 08/018,644, Feb. 17, 1993, Pat. No. 5,430,270.

[51] Int. Cl.[6] .................................................. B23K 26/00
[52] U.S. Cl. ............................... 219/121.64; 219/121.84; 219/121.63
[58] Field of Search ......................... 219/121.63, 121.64, 219/121.45, 121.46, 121.85, 121.84, 59.1, 60 A, 61.1; 376/260

[56] References Cited

U.S. PATENT DOCUMENTS

| | | | |
|---|---|---|---|
| 4,490,599 | 12/1984 | Lebedev et al. ........................ | 219/61.1 |
| 5,182,429 | 1/1993 | Pirl et al. ............................. | 219/121.63 |
| 5,196,671 | 3/1993 | Kroehnert ............................ | 219/121.63 |
| 5,426,278 | 6/1995 | Hirano et al. ........................ | 219/121.63 |
| 5,430,270 | 7/1995 | Findlan et al. ....................... | 219/121.63 |
| 5,446,256 | 8/1995 | Cartry ................................. | 219/121.63 |
| 5,514,849 | 5/1996 | Findlan et al. ....................... | 219/121.63 |
| 5,593,605 | 1/1997 | Jones .................................. | 219/121.63 |
| 5,667,706 | 9/1997 | Pirl et al. ............................ | 219/121.64 |

OTHER PUBLICATIONS

"Laser Annealing for Stress–Relief of Steam Tubes" American Research Corporation of Virginia, Mar. 1989, EPRI Project RP2614–36.

*Primary Examiner*—Mark Paschall
*Attorney, Agent, or Firm*—William S. Galliani; Pennie & Edmonds LLP

[57] ABSTRACT

An apparatus for welding the interior surface of a tube includes a laser welding probe body configured for positioning within an interior surface of a tube. A centering mechanism relying upon fluid pressure is used to substantially center the laser welding probe body within an annular void defined between the laser welding probe body and the interior surface of the tube. In one embodiment, the centering mechanism is implemented with a set of seals. In another embodiment, the centering mechanism is implemented with a set of centering balls that respond to the fluid pressure and thereby operate to center the laser welding probe body within the annular void. The fluid pressure may be created with shielding gas used during the laser welding operation.

13 Claims, 19 Drawing Sheets

APPARATUS AND METHOD FOR CENTERING A LASER WELDING PROBE WITHIN A TUBE USING GAS PRESSURE

This application is a continuation-in-part of the application entitled "Rotating Fiber Optic Coupler for High Power Laser Welding Applications", Ser. No. 08/410,714, filed Mar. 27, 1995, now U.S. Pat. No. 5,653,897, which is a continuation-in-part of the application entitled "Rotating Apparatus for Repairing Damaged Tubes", Ser. No. 08/192,556, filed Feb. 7, 1994, now U.S. Pat. No. 5,514,849, which is a continuation-in-part of the application entitled "Method and Apparatus for Repairing Damaged Tubes", Ser. No. 08/018,644, filed Feb. 17, 1993, now U.S. Pat. No. 5,430,270. Priority is claimed only for the application entitled "Rotating Fiber Optic Coupler for High Power Laser Welding Applications", Ser. No. 08/410,714, filed Mar. 27, 1995.

BRIEF DESCRIPTION OF THE INVENTION

This invention relates generally to the repair of heat exchanger tubes, such as steam generator tubes in pressurized water reactor power plants. More particularly, this invention relates to a technique of centering a laser welding probe in a heat exchanger tube during repair operations.

BACKGROUND OF THE INVENTION

In nuclear power plants utilizing the pressurized water reactor cycle, heat is released in the reactor from the fission of nuclear fuel. The heat is removed from the reactor by continuously circulating a fluid called reactor coolant. After being heated in the reactor, the coolant flows to a heat exchanger, commonly referred to as the steam generator, where it gives up heat and then returns to the reactor for further heating. In the steam generator, the nuclear reactor coolant heats a secondary water which is then used to drive a steam turbine. After exiting the steam turbine, the steam is condensed and returned to the steam generator for further heating by the reactor coolant. The reactor-steam generator coolant loop is normally referred to as the primary loop and the steam generator-turbine loop is usually referred to as the secondary loop.

The steam generator is typically a shell and tube type heat exchanger with the primary coolant passing through the inside of the heat exchanger tubes and the secondary water passing over the outside surface of the tubes and contained by the shell of the heat exchanger. Heat transfer from the reactor coolant to the secondary water occurs over most of the length of the tubes. To effect a seal at the end of the tubes, and thus prevent mixing of the reactor coolant and the secondary water, the ends of the tubes are connected to a tube sheet comprising a flat plate with apertures therethrough for receiving the ends of the tubes. The ends of the tubes are either seal welded to the tube sheet or expanded in the apertures to effect a sealed joint. The peripheral edges of the tube sheet are sealed to the shell of the steam generator and to a reactor coolant water box.

Steam generators are usually oriented such that the tubes generally run in a vertical direction and can be of the straight through or return flow type. In the straight through type steam generator, the tubes are straight and connected to tube sheets at both ends. The reactor coolant enters a water box at the top of the steam generator, flows through the tubes and is collected in a water box at the bottom of the steam generator. More common is the return flow type steam generator in which the tubes are an inverted "U" shape having both ends connected to the same tube sheet at the bottom of the steam generator. The water box below the tube sheet contains a division plate oriented to effectively seal that portion of the tube sheet containing tube inlets from that portion containing outlets. In this manner, reactor coolant flows into the inlet portion of the water box, through the inverted "U" tubes and into the outlet portion of the water box. In either the straight through or return type steam generator, the tubes are very long and require support along their length. This is accomplished by positioning support plates within the shell of the heat exchanger at various positions along the length of the tubes. The support plates contain apertures through which the tubes pass and have their peripheral edges connected to the shell of the steam generator.

To facilitate installation of the tubes and to allow for differential thermal expansion between the tubes and the shell, the apertures in the support plates are oversized to allow sliding of the tube relative to the support plate. However, the apertures in the plate must be small enough to provide adequate horizontal support for the tubes and to prevent excessive tube vibration during operation. Thus, crevices are formed between the support plates and the tubes. These crevices collect debris and corrosion products during operation of the steam generator, thereby promoting crevice corrosion. In addition, the joints between the tubes and the tube sheet previously described contain crevices which lead to crevice corrosion.

Steam generator tubes are susceptible to several types of corrosion mechanisms that can ultimately lead to leakage or significant wall thinning. These include primary water stress corrosion cracking, secondary side intergranular attack, secondary intergranular stress corrosion cracking and secondary side wastage. Primary side degradation typically occurs at locations of high tensile residual stress such as expansion transition areas, inner row U-bends, and tube support locations. Secondary side degradation occurs at locations where impurities can concentrate, providing corrosion sites, such as tube-to-tube sheet crevices, tube support plate-to-tube interfaces, anti-vibration bars interfaces, and sludge pile regions. Current mitigation techniques for these corrosion-induced problems include: steam generator replacement, plugging degraded tubes, electroplating tube interior surfaces, and sleeving degraded tubes.

Steam generator replacement is a drastic solution involving substantial capital investment and months or years of plant down time with the attendant loss of revenue accompanying extended plant outages. Plugging of the degraded tubes takes the tube out of service, reducing the steam generator efficiency. The ability to plug tubes is based on the "plugging margin" that is calculated based on operating experience for each steam generator. Once the "plugging margin" has been expended, further plugging of tubes reduces the capacity of the steam generator and the entire plant must be de-rated—operated at a reduced capacity.

Electroplating the steam generator tubes with nickel allows the tube to remain in service. Furthermore, nickel plating will seal small leaks and prevent further degradation, but does not restore the structural integrity of the tube. Therefore, a major limitation of electroplating is that it is effective only on small cracks that are detected early so that repair can be accomplished before the strength of the tube is seriously degraded.

Sleeving is a more expensive mitigation technique, but allows the tube to remain in service. Sleeving is accomplished by inserting in the damaged portion of the steam generator tube a short, tubular sleeve having an external diameter slightly less than the internal diameter of the steam generator tube and welding the sleeve to the tube. The sleeve is generally made of the same material as the tube and, in effect, replaces the damaged section of tubing. Therefore, the structural integrity of the tube is restored by this method of repair. Sleeving is generally performed when the steam generator "plugging margin" is approached.

One approach to sleeving is disclosed in U.S. Pat. No. 5,066,846 issued Nov. 19, 1991 to William E. Pirl and incorporated by reference herein. In that patent, the sleeve is welded to the tube using a laser beam welding head positioned inside the tube. Laser energy from a laser source is directed through a fiber optic cable to the welding head where a canted mirror reflects the beam onto the interior surface of the sleeve. The weld head rotates in one axial position along the tube near one end of the sleeve and the laser beam delivers sufficient heat to fuse the sleeve to the tube in a narrow, circumferential band around the sleeve/tube interface. The weld accomplished by this method is what is commonly referred to in the art as an autogenous weld in that the base metal of the sleeve and tube are melted and fused and no additional filler metal is added during the welding process. The weld head is then repositioned at the other end of the sleeve and another autogenous weld is accomplished.

Although sleeving in this manner can restore the structural integrity of the tube, it has a number of disadvantages. First, the sleeve necessarily decreases the internal diameter of the tube passage, adding increased pressure drop to the flow of coolant through the tube when the steam generator is placed in service. Also, if the repair is located in the lower portion of a tube, such as at the tube sheet, subsequent repair of tube degradation above the location of the first sleeve is prevented because another sleeve cannot be inserted past the already installed sleeve. In addition, the autogenous welds at both ends of the sleeve are usually recessed from the end of the tube because it is very difficult to accomplish a quality fillet weld on the end of the sleeve without adding filler metal. Because these welds are recessed from the ends of the sleeves, a crevice remains between the sleeve and the tube in the region between the end of the sleeve and the weld. Also because the welds themselves are narrow, circumferential bands, the external area of the sleeve between the bands forms a crevice with the tube. The damage to the tube which necessitated the repair, such as a crack or a pin hole, allows entrance of water into this crevice. These crevice areas are again susceptible to many forms of corrosion when the steam generator is placed back in service.

Attempts have been made to use a continuous, autogenous weld inside the tube, without the use of a sleeve, in order to repair damaged tubes. These efforts have failed because the corrosion which led to the damage leaves oxidized surfaces which result in flaws and voids when autogenous welding is used. If filler material is used in the welding process, the filler material can contain deoxidizing and viscosity control agents which prevent the flaws and voids associated with autogenous welding. Furthermore, the use of a filler material permits the ability to build-up the tube wall, thus providing full structural replacement of the damaged tube wall with the new weld deposit.

Thus, it is apparent that improved mitigation techniques are needed to meet the future demands of PWR power plants. Once the tube plugging margin has been used and a large quantity of sleeves (i.e. >10% of the tubes) have been installed to permit continued operation, tube degradation eventually leads to a decision to replace the steam generator, de-rate the plant, or decommission the facility. Therefore, alternative repair technology is needed that can provide extended tube service to the end of plant life, at an economical cost.

U.S. Pat. Nos. 5,430,270 and 5,514,849 describe technologies that economically extend tube service in PWR power plants. U.S. Pat. No. 5,430,270, assigned to the assignee of the present invention, describes a technique for clad welding the interior surface of a heat exchanger tube. U.S. Pat. No. 5,514,849, assigned to the assignee of the present invention, describes an improved technique for clad welding the interior surface of a heat exchanger tube through reliance upon a synchronously rotating apparatus. A laser welding probe is positioned within the synchronously rotating apparatus. In order to execute precision welding operations, it is necessary to maintain the laser welding probe at a predetermined position, typically a centered position. This goal is inherently difficult to achieve, and is even more difficult to achieve if a single laser welding probe is to be used with different sized tubes. A different sized tube is not necessarily limited to a different heat exchanger tube, rather the same heat exchanger tube may have different interior circumferences, as in the case of a tube with sleeve repairs.

Spring-loaded pads, wheels, or levers are used in the prior art to positionally center devices within structures. If applied to the synchronously rotating apparatus of U.S. Pat. No. 5,514,849, such techniques would create rotational resistance or drag, thus affecting the rotational speed and stability of the laser welding probe system.

In view of the foregoing, it would be highly desirable to provide an improved technique for centering a laser welding probe within a tube. The technique should provide a low drag centering method that allows smooth rotation of the weld head, while maintaining its radial position within the tube. In addition, the technique should allow a single laser welding probe to be used with a tube or tubes having different interior circumferences.

SUMMARY OF THE INVENTION

The invention includes an apparatus for welding the interior surface of a tube. The apparatus includes a laser welding probe body configured for positioning within an interior surface of a tube. A centering mechanism relying upon fluid pressure is used to substantially center the laser welding probe body within an annular void defined between the laser welding probe body and the interior surface of the tube. In one embodiment, the centering mechanism is implemented with a set of seals. In another embodiment, the centering mechanism is implemented with a set of centering balls that respond to the fluid pressure and thereby operate to center the laser welding probe body within the annular void. The fluid pressure may be created with shielding gas used during the laser welding operation.

The invention provides an efficient technique for centering a laser welding probe body within a tube. This centering operation provides important laser welding accuracy improvements. The technique results in minimal rotational resistance or drag, thus the rotational speed and stability of the laser welding probe system is preserved. Advantageously, a single implementation of the invention can be used with a variety of tube circumferences.

BRIEF DESCRIPTION OF THE DRAWINGS

For a better understanding of the nature of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

The present invention is applicable to the repair of corroded or damaged small diameter tubes used in any application such as heat exchangers or material transport systems. The following detailed description of the apparatus and operation of the present invention uses, by way of example, a specialized heat exchanger known as a steam generator which is used in a pressurized water reactor nuclear power plant cycle.

Figure 1:
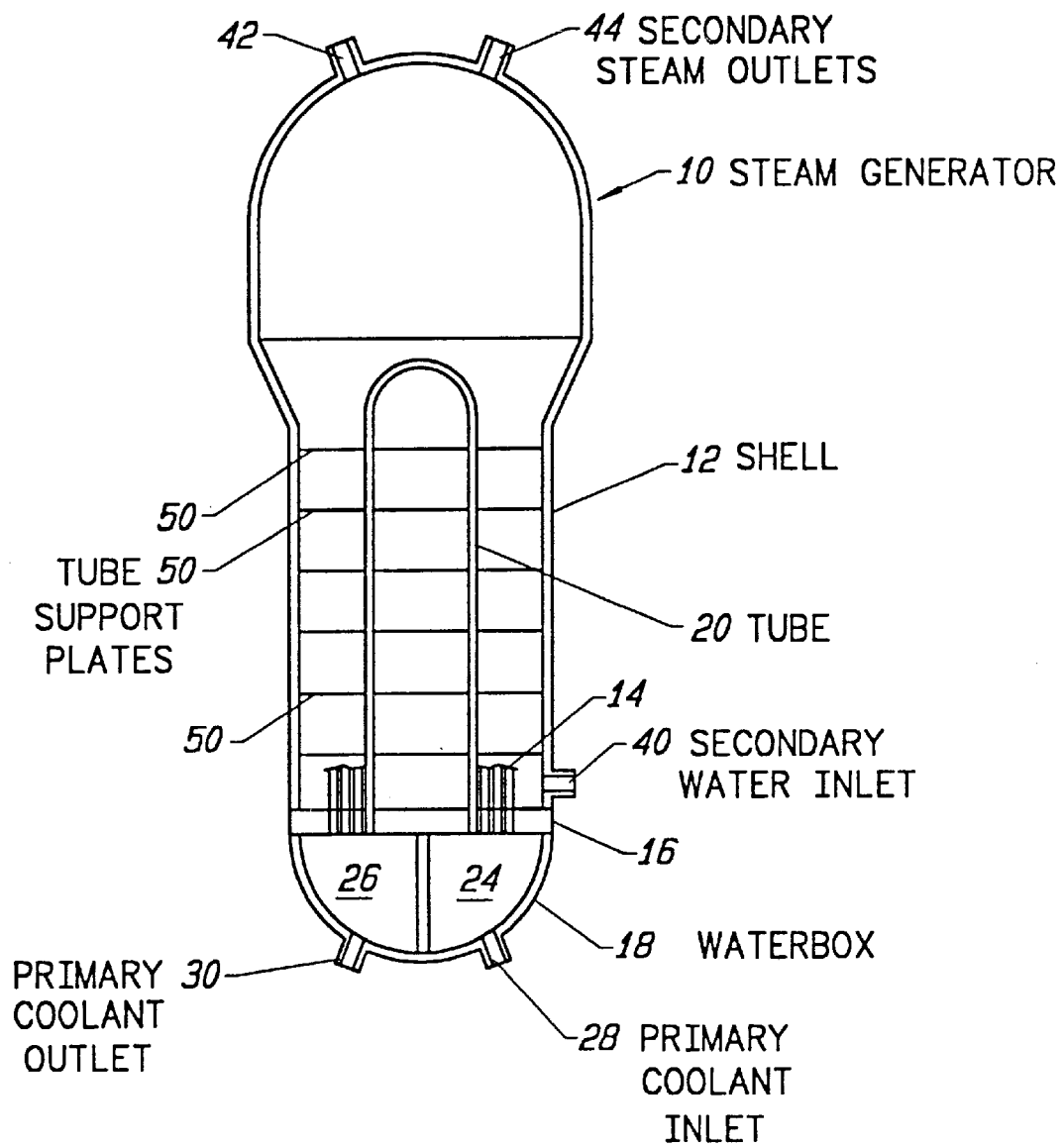
FIG. 1 is a sectional elevation view of a typical steam generator used in a pressurized water reactor power plant.

Turning now to FIG. 1, wherein like numerals designate like components throughout all of the several figures, a typical steam generator of the return type is depicted. The steam generator, generally designated as 10 consists of a shell 12, a tube nest 14, a tube sheet 16 and a water box 18. For clarity in the illustration, only one "U" shaped tube 20 is depicted but it is understood that tube bundle 14 can be made up of thousands of individual tubes 20. Division plate 22 divides water box 18 into a first inlet section 24 and an outlet section 26. In operation, hot reactor coolant enters inlet section 24 or water box 18 through nozzle 28. From the inlet section 24, the coolant flows through tubes 20 to the outlet section 26 of the water box and back to the reactor (not shown) through nozzle 30. Secondary water enters the shell 12 through nozzle 40 and is heated by contact with tubes 20. As the secondary water is heated, it boils, generating steam which exits the shell 12 at the top of the steam generator 10 through nozzles 42, 44. The steam thus generated is routed to a steam turbine (not shown) where it is expanded to drive an electrical generator (not shown).

In the steam generator, the tubes 20 are connected to tube sheet 16 by seal welding or by expanding the tube within the tube aperture in the tube sheet 16. Located at various heights in the shell 12 are tube support plates 50 containing apertures therethrough for passage of tubes 20. The apertures in tube support plates 50 are slightly larger in diameter than the outside diameter of tubes 20 so that the tubes can slide vertically within the support plates. This relative sliding capability is necessary to accommodate differential thermal expansion which occurs when the steam generator 10 is brought on line and slowly heated to operating temperature. As previously noted, the crevices formed between the support plates 50 and the tubes 20 as well as the crevices located at the attachment of tubes 20 to tube sheet 16 are susceptible to corrosion which degrades the tubes 20, ultimately leading to tube rupture or failure.

Figure 2:
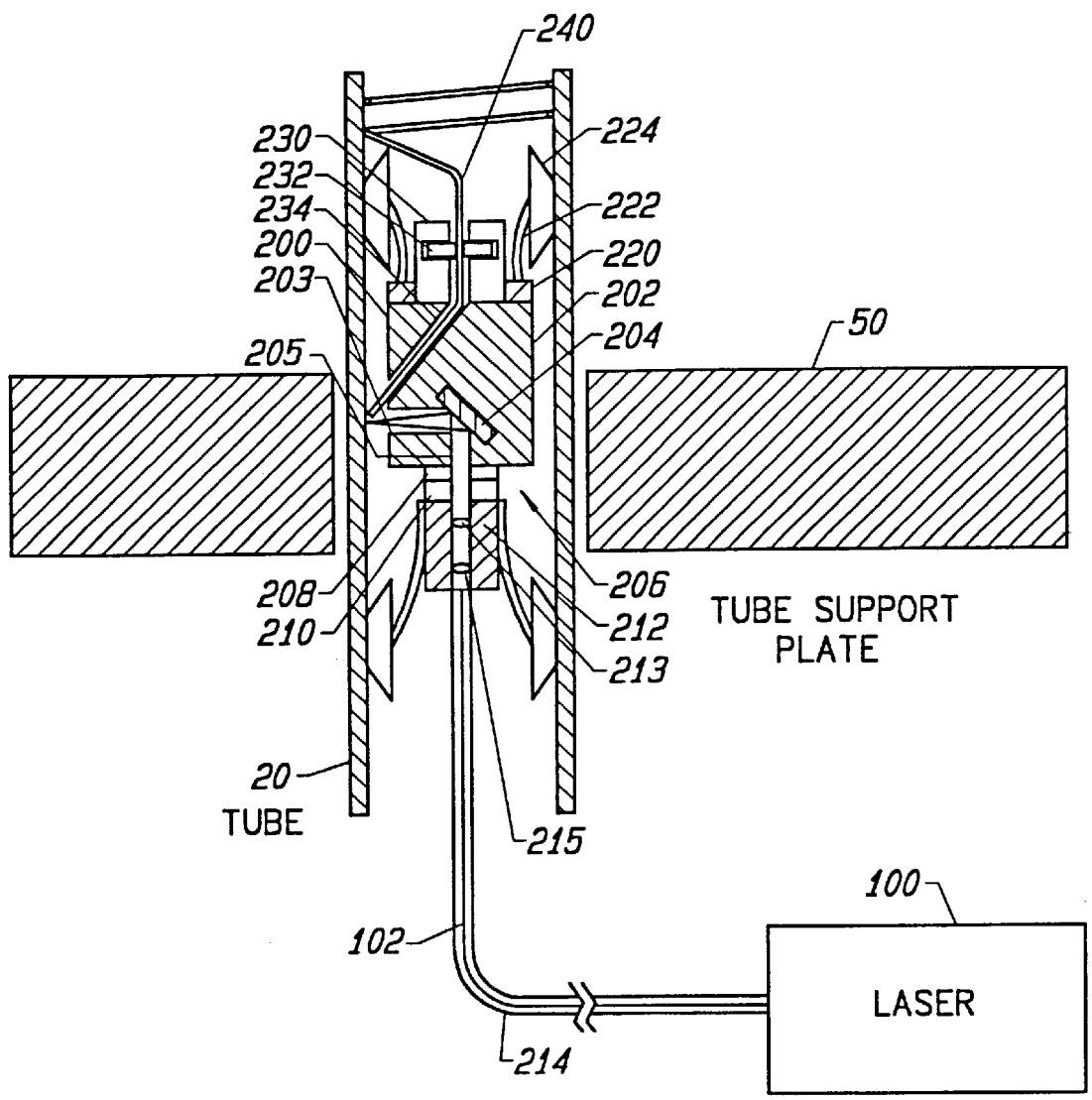
FIG. 2 is a cross-sectional view of one embodiment of the laser clad welding repair apparatus positioned within a steam generator tube and using a pre-positioned coil of wire as the filler metal.

Referring now to FIG. 2, a cross-sectional view of one embodiment of the laser clad welding repair apparatus is depicted. This figure shows the overall installation and use of the invention to clad weld the interior of a small diameter tube. Illustrated is a portion of a steam generator tube 20 where it passes through a tube support plate 50. Typically, the clearance between the exterior surface of tube 20 and the internal diameter of the aperture through the support plate 50 is on the order of 0.008 to 0.015 inches. Thus, the potential for crevice corrosion is apparent. In this embodiment, the apparatus is positioned within a steam generator tube and uses a pre-positioned coil of wire as the filler metal.

Laser 100 is the heat source for welding the damaged tube 20. The laser 100 can be of any type commonly used for welding but more typically is an Nd:YAG laser. An example of such a laser which has been used by the inventors is a Hobart Laser Products model 2400 which produces 2400 watts of power. Laser 100 is connected to an optical fiber 102 which guides the laser power generated by the laser source 100 to the weld head 200.

Weld head 200 comprises a cylindrical rotary body 202. Housed within body 202 is mirror 204 which is oriented at a predetermined angle in relation to the axis of body 202. As will be discussed below, directional optics may be substituted for the mirror 204. Two passage ways for laser beam light are bored in body 202. The first passageway 203 is concentric with the cylindrical axis of body 202 and enters from its lower surface and terminates at the surface of mirror 204. The second passageway 205 is bored radially from the circumference of body 202 and terminates again at the surface of mirror 204. In this manner, laser beam light entering the bottom of body 202 reflects off mirror 204 radially out to the interior surface of tube 20.

Connected to the bottom of body 202 is a rotary joint 206. Rotary joint 206 comprises an upper, rotary portion 208 and a lower, stationary portion 210 and allows the body 202 of weld head 200 to rotate about its axis. Connected to stationary portion 210 of rotary joint 206 is rotating head drive motor 212. Drive motor 212 is a hollow shaft miniature electric or pneumatic motor which provides the rotary force necessary to turn body 202 during operation of the weld head 200.

The bottom of motor 212 is connected to flexible cable 214 which connects to laser source 100 and contains optical fiber 102. Cable 214 also includes electrical wires (not shown) to power drive motor 212 if it is electric.

In the case when a pneumatic motor is used to drive the weld head 200, cable 214 houses a pneumatic tube (not shown) to drive motor 212. In addition, cable 214 can include conduit (not shown) for the delivery of shielding gas such as argon or helium to improve the final weld as is commonly understood by those skilled in the welding arts. Shielding gas can be delivered through a dedicated tube or conduit, although it is most often forced through gaps between a fiber optics cable, a wire conduit and a sleeve. The gas is then distributed by drilling holes in the weld head to direct the gas toward the welding process.

Because motor 212 has a hollow shaft, laser energy can pass through motor 212 and rotary joint 206 to mirror 204. Mounted within the hollow shaft of motor 212 are focusing lenses 213 and 215. These lenses can adjust the focal length of the passageway so that the laser energy is concentrated on the interior surface of tube 20. Various methods known to those skilled in the art are available for adjusting the distance between lens 213 and lens 215 which allows the focal length to be adjusted so the same weld head 200 can be used in tubes of different internal diameters.

Mounted on the top of weld head body 202 is ring shaped bearing 220. Bearing 220 is rotatably connected to body 202 to allow relative rotary motion. Connected to rotary bearing 220 and drive motor 212 are leaf springs 222 which have shoes 224 mounted on their distal ends. Leaf springs 222 urge shoes 224 radially outward from the centerline axis of weld head 200. Shoes 224 engage the interior wall of tube 20 and function to hold weld head 200 centered in tube 20 while the weld head is operated. However, the relatively light friction between shoes 224 and tube 20 allow weld head 200 to be easily moved axially within the tube so that the weld head can be accurately positioned for a welding operation.

Also mounted on the top of weld head body 202 and within ring shaped bearing 220 is filler wire feed motor 230. Filler wire feed motors 230 have been used in gas and heliarc welding applications in such industries as the automobile industry. Thus, their construction and operation are generally known in the art. Feed motor 230 has a hollow shaft and a plurality of friction wheels 232 which grip a wire and feed it linearly through the hollow shaft. The axis of rotation for friction wheels 232 is slightly offset from the axis of rotation of the welding head body 202. Therefore, as weld head body 202 is rotated, the friction wheels impart a linear motion to wire held between the tangentially engaging surfaces of the wheels. The hollow shaft of feed motor 230 terminates at the lower edge of motor 230, in alignment with filler wire guide 234.

Filler wire guide 234 is a bored passageway through weld head body 202. The upper entrance to guide 234 is centered in the upper surface of body 202 and the lower exit of guide 234 is at the side of body 202, directly above the radial exit of laser beam passageway 205. In this manner, wire fed through guide 234 is directed to the location of welding. Above weld head 200 is depicted filler wire 240.

Filler wire 240 is made of a similar material as tube 20. Preferably, an Inconel® alloy with a higher chromium content than the tube material is used to reduce susceptibility to corrosion cracking. Inconel® alloy 625, 52 or 72 may be used and can include deoxidizing and viscosity control agents such as silicon and titanium.

Filler wire 240 is preshaped into a coil having an exterior diameter which approximately coincides with the interior diameter of tube 20. Friction between coiled filler wire 240 and the interior surface of tube 20 holds the wire in place during operation of the weld head 200.

The lower end of filler wire 240 passes through friction wheels 232 in wire feed motor 230 into guide 234 and out the side of body 202 to the location of the weld. Weld head 200 is positioned within tube 20 at the location of the repair. Weld head 200 redirects the laser energy from the optical fiber in a radial direction against the interior wall of tube 20.

The following describes the procedure and operation used to accomplish a tube repair with the present invention. First, filler wire 240 is coiled so that the outside diameter of the coil approximately matches the internal diameter of tube 20. The lower end of wire 240 is bent to the center of the coil and then bent downward so that the end will lie on the centerline of the tube 20 after the coil is inserted in the tube. The coil of filler wire is then inserted into the tube 20 and pushed to a position slightly above the intended weld repair. The coil can be moved in the tube without deforming its shape by using a flexible hollow hose of outside diameter slightly less than the internal diameter of tube 20.

After the wire coil has been positioned, the weld head 200 is inserted into the tube 20, wire feed motor 230 first. Insertion of the weld head 200 is accomplished by compressing shoes 224 radially inward and then inserting the weld head 200 into tube 20. The weld head 200 is then pushed within the tube by feeding cable 214 into the tube 20 until weld head 200 is positioned at the location of the repair. When weld head 200 reaches the proper location, the end of filler wire 240 coil which was previously positioned, will feed into the center of wire feed motor 230 and be engaged by friction wheels 232. The coil of filler wire may also be located in a cylinder mounted on top of the weld head so that both the weld head and filler wire may be inserted into the tube at the same time.

To commence welding, power, either electric or pneumatic, is applied to drive motor 212 which rotates weld head body 202. Rotation of the weld head body 202 causes wire feed motor 230 to feed wire 240 through wire guide 234 to the interior wall of tube 20. At the same time, the laser source 100 is turned on and laser energy is transmitted to the internal wall of tube 20 via optical fiber 102 and mirror 204. Weld head 200 can be moved axially within tube 20 by pulling on cable 214. Alternately, a precision thread connection, well known to those skilled in the art, between weld body 202 and ring bearing 220 can accomplish uniform axial advance of the weld head body 202 during the welding operation. Thus, as weld head body 202 rotates, the base metal of tube 20 is melted, while filler wire is fed to the location of the weld. The filler wire is melted to produce a clad weld.

Figure 3:
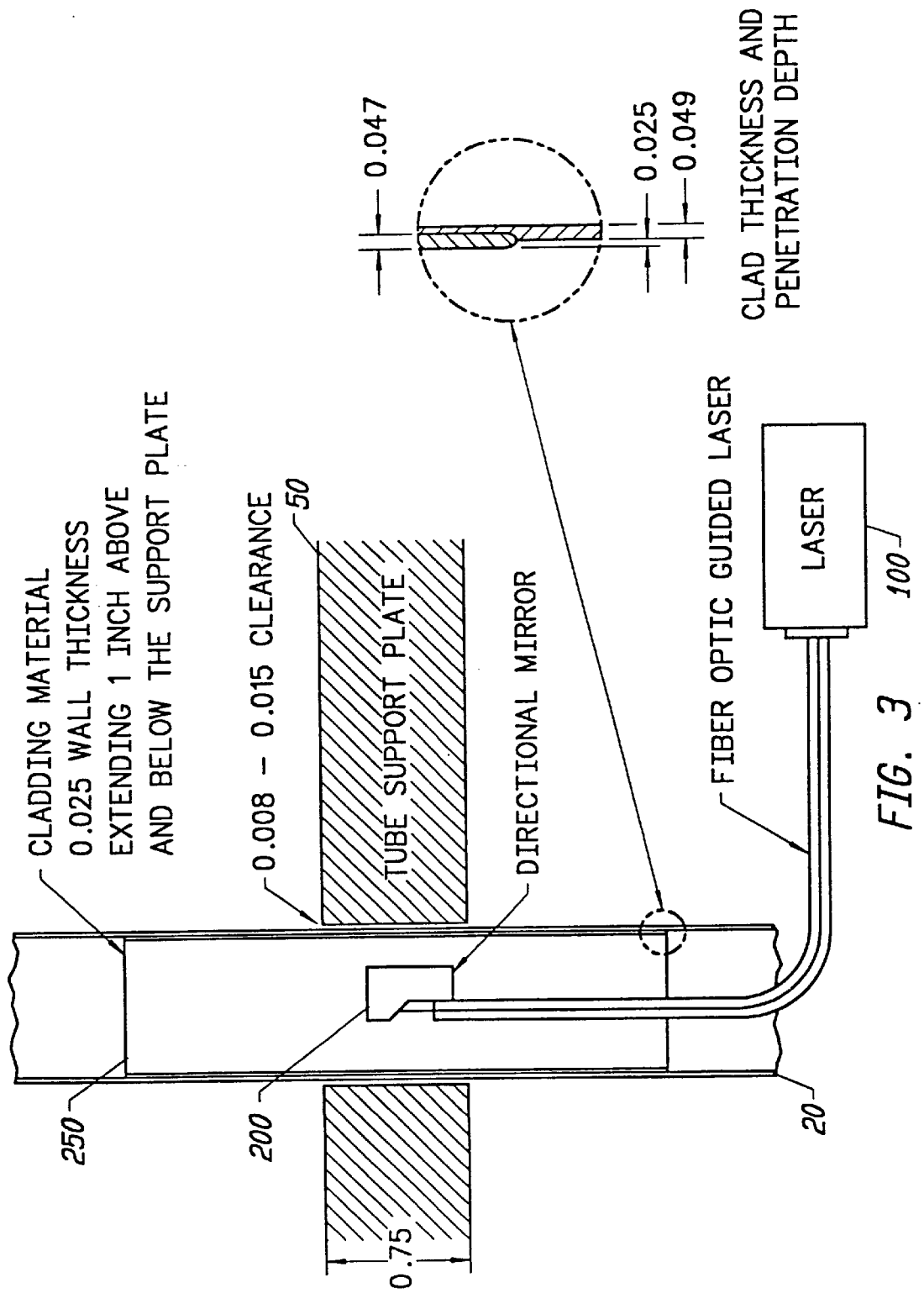
FIG. 3 is a simplified cross-sectional view of another embodiment of the laser clad welding apparatus positioned within a steam generator tube near a tube support plate.

Referring now to FIG. 3, a simplified cross-sectional view of another embodiment of the laser clad welding apparatus is depicted. In this embodiment, a thin sheet 250 of weld filler material is used in lieu of the filler wire 240 previously described. The weld filler material used in the sheet can have deoxidizing and viscosity control agents as previously described for the filler wire 240. The sheet 250 of filler metal is approximately 0.025 inches thick and is bent into the form of a hollow cylinder having a length to coincide with the length of the tube section to be repaired. (The thickness of the filler metal is determined by the desired build up or clad thickness). The external diameter of the cylinder thus formed is approximately equal to the internal diameter of tube 20 and therefore the cylinder can be prepositioned in a manner similar to that previously described for the wire coil.

After the cylinder is pre-positioned, the weld head 200 is inserted in the tube and the weld is accomplished in the same manner. The resulting weld yields a uniform cladding which decreases the internal diameter of the tube by only 0.050 inches. Penetration depth of the weld is approximately 0.022 inches resulting in a clad thickness of 0.047 inches and an excellent bond is effected between the thin sheet 250 and the tube 20. A clad thickness of 0.047 inches fully restores the original wall thickness and structural integrity of the tube, which has a nominal thickness of 0.042 inches. It will be appreciated that the penetration and clad thickness is governed by selected welding parameters (laser output, travel speed, pitch, foil thickness, etc.).

Figure 4:
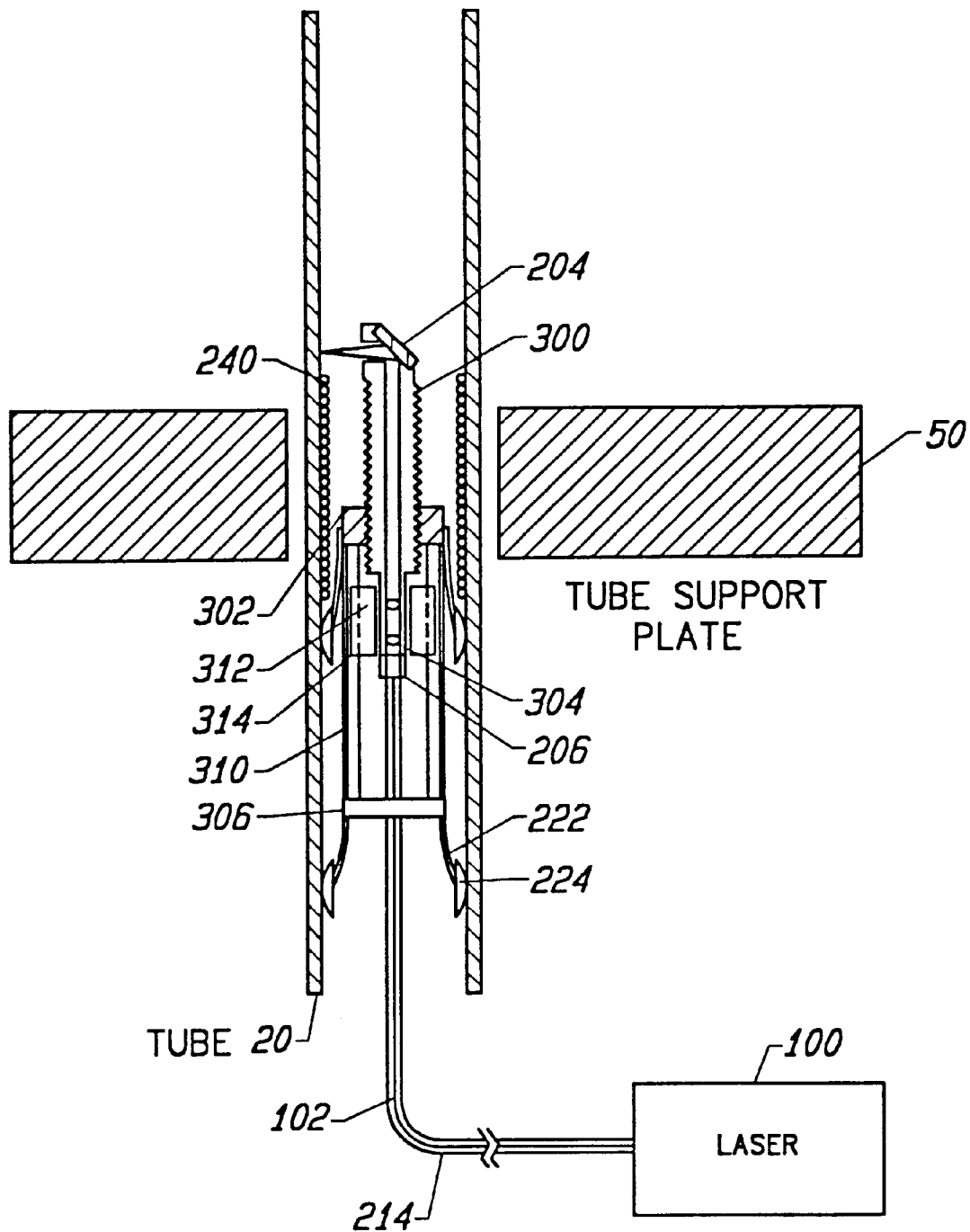
FIG. 4 is a cross-sectional view of an alternate embodiment of the laser clad welding repair apparatus positioned within a steam generator tube and using a coil of fill metal wire pre-positioned directly over the area to be clad welded.

Turning now to FIG. 4, a third embodiment of the present invention is depicted. FIG. 4 shows a simplified cross-sectional view of an alternate embodiment of the laser clad welding repair apparatus positioned within a steam generator tube and using a pre-positioned coil of fill metal wire directly over the area to be clad welded. In this embodiment, weld head 200 consists of a hollow, threaded rod 300 with mirror 204 mounted on top at a predetermined angle, say a forty-five (45) degree angle. Rod 300 screws into circular and internally threaded upper end plate 302. The lower end of rod 300 serves as the armature 304 for drive motor 212. Upper end plate 302 is connected to a washer shaped lower end plate 306 by guide rods 310. Lower and upper end plates 306, 302 are held in position within tube 20 by leaf springs 222 and shoes 224. Guide rods 310 are "T" shaped in cross section and are positioned parallel to the axis of rod 300 with center flanges facing radially inward toward the center of the weld head apparatus 200. The stator 312 of motor 212 has longitudinal grooves 314 on each side which accept the edges of guide rods 310. The bottom of motor armature 304 is attached to rotary joint 206 which in turn is attached to cable 214.

In operation, a tightly wound coil of filler wire 240 is prepositioned within tube 20 directly over the area to be clad welded. Weld head 200 is then inserted in the tube so that mirror 204 is slightly above the top of wire 240. When laser energy is supplied to the weld head 200 and motor 212 is energized, rod 300 and mirror 204 rotate directing laser energy onto the coil of wire 240. In addition, rod 300 threads into upper plate 302 causing the weld beam to travel axially downward through coiled wire 240 at a rate which is synchronized with its rotary motion. To accommodate the axial movement of rod 300, motor stator 312 slides along guide rods 310 but is prevented from rotating by grooves 314 which are engaged with the edges of guide rods 310. Thus, the laser beam rotates and travels axially within the tube, fusing wire 240 to the interior surface of tube 20, producing a uniform clad weld.

Figure 5:
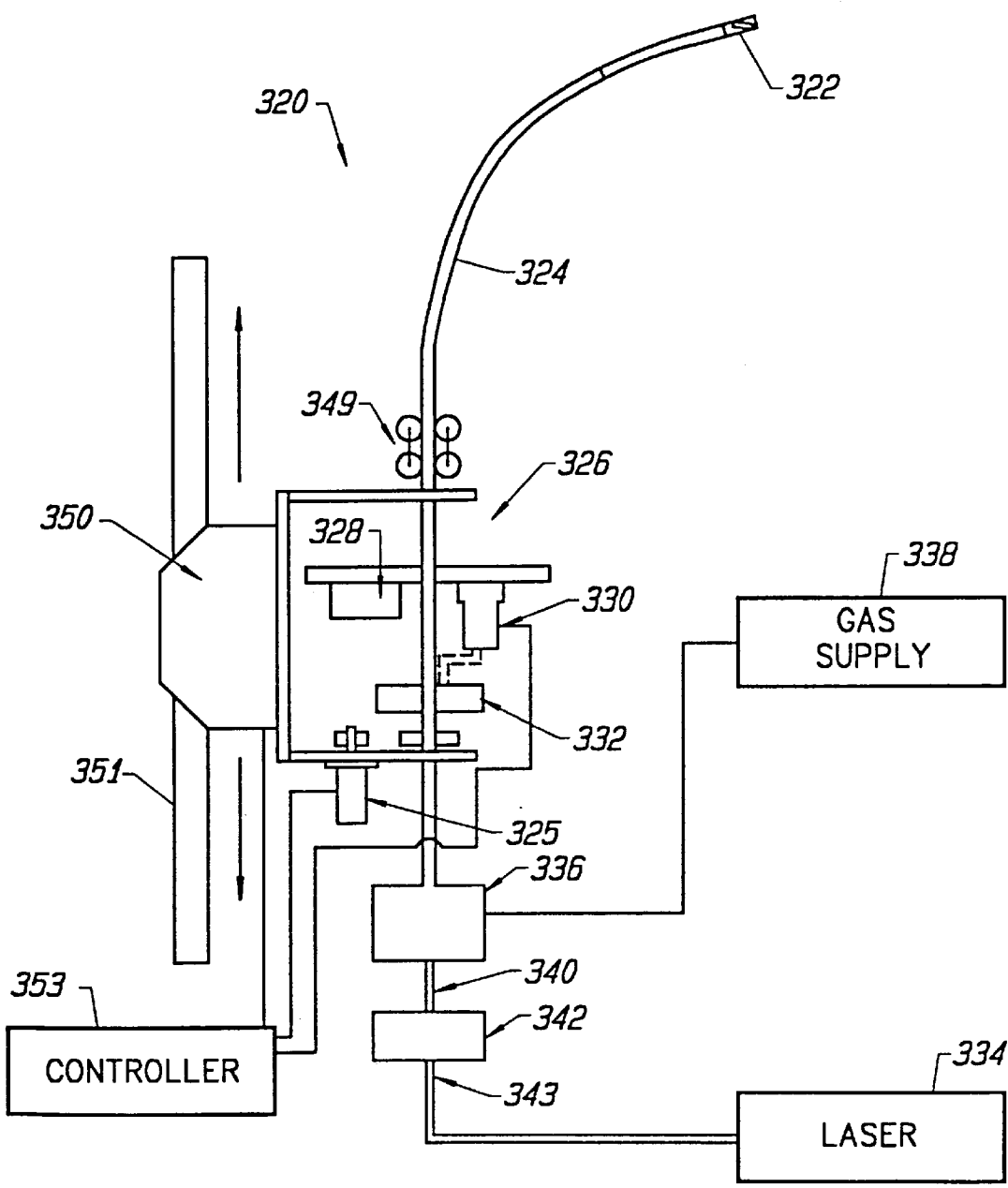
FIG. 5 is a side view of a rotating apparatus utilized in accordance with the present invention.

FIG. 5 illustrates an alternate embodiment of the invention wherein a rotating apparatus 320 is used to repair damaged tubes 20. In this embodiment, the rotating head drive motor 212 and the accompanying rotary joint 206 utilized in the embodiments of FIGS. 2–4 is substituted with a number of rotating elements. Specifically, a rotating welding head 322 is positioned at the end of a rotating sleeve 324. A rotating drive mechanism 325 rotates the sleeve 324.

The rotating drive mechanism 325 simultaneously rotates a filler assembly 326 that includes a filler metal receptacle 328 and a filler metal delivery system 330. The filler metal receptacle 328 holds the filler metal to be welded. Generally, the filler metal receptacle 328 will be in the form of a reel of filler metal wire. The filler metal delivery system 330 receives the filler metal and delivers it to a filler passage within the rotating sleeve 324. Since the rotating sleeve 324 and the filler assembly 326 rotate synchronously, the filler metal does not become tangled.

The filler metal delivery system 330 is powered through filler assembly slip rings 332. The speed of the wire feed motor can be varied to permit different wire feed speeds, providing control of clad thickness and to allow adjustment for variations in laser output levels, travel speed, rotational pitch, and other factors.

The rotating apparatus 320 also includes a gas coupler 336 that is connected to a gas supply 338. The rotating sleeve 324 includes a rotating fiber optic cable 340. A laser 334 supplies energy to a fixed fiber optic cable 343. The laser energy is transferred from the fixed fiber optic cable 343 to the rotating fiber optic cable 340 through an optical coupler 342, a preferable embodiment of which is described below.

The rotating apparatus 320 is moved along its longitudinal axis by an axial drive system 350 mounted on shaft 351. Guide rolls 349 may be used to guide the rotating sleeve 324 into position. A computer controller 353 is used to control the operation of the rotating apparatus drive mechanism 325, the axial drive system 350, and the filler metal delivery system 330. In particular, the computer controller 353 is used to set the speed of the rotating apparatus drive mechanism 325, the position for the axial drive system 350, and the filler delivery rate for the filler metal delivery system 330.

Figure 6:
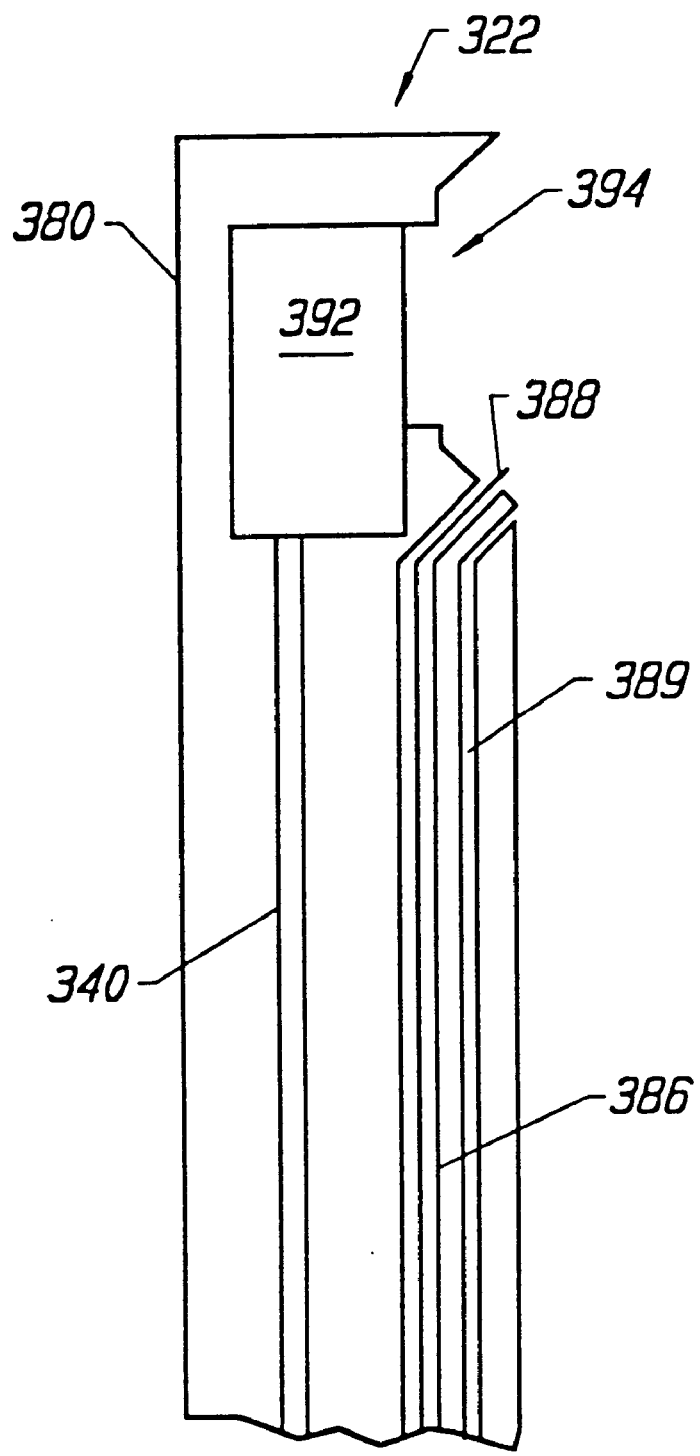
FIG. 6 is a side cross-sectional view of a rotating welding head positioned at the end of the rotating sleeve of the rotating apparatus of FIG. 5.

The operation of the rotating apparatus 320 is more fully appreciated with reference to FIG. 6 which provides an enlarged cross-sectional view of the rotating welding head 322. The rotating welding head 322 includes a body 380 which defines a filler passage 386. The filler passage 386, also called the "wire conduit", runs the length of the rotating sleeve 324. Filler 388 is forced from the filler metal delivery system 330 through the filler passage 386 to a body aperture 394. The laser energy is delivered through the body aperture 394 and welds the filler 388. Gas conduit 389 delivers a shielding gas to the welding head 322. Preferably, the gas conduit 389 terminates in distribution channels (not shown) that distribute the gas to the aperture 394 at a number of locations.

FIG. 6 also depicts the rotating fiber optic cable 340 positioned within the body 380 of the rotating welding head 322. The rotating fiber optic cable 340 runs the length of the rotating sleeve 324 and is affixed thereto.

Figure 7:
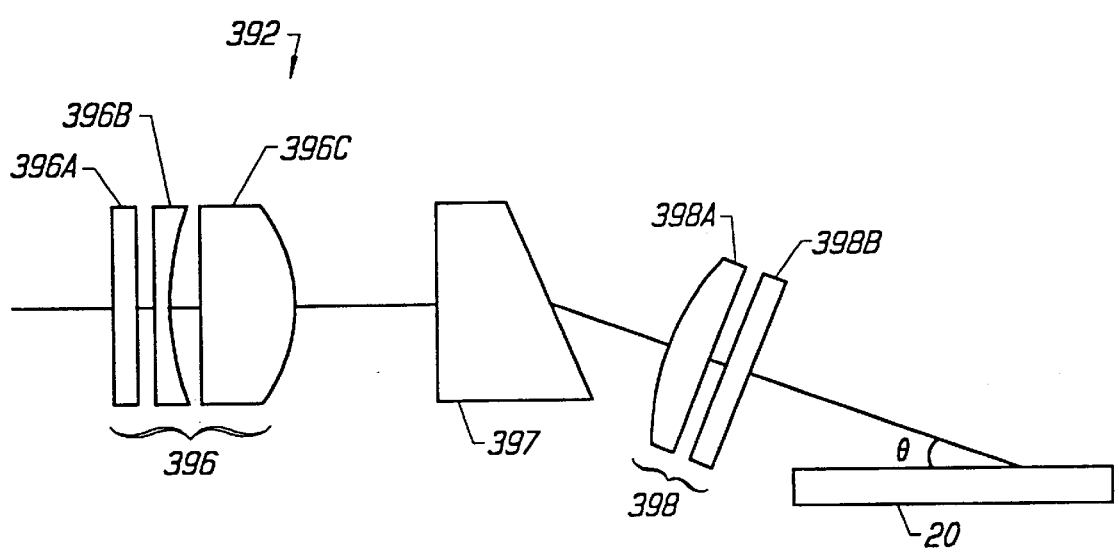
FIG. 7 is a side view of a laser energy directional modification assembly implemented with a wedge prism.

The rotating fiber optic cable 340 terminates at a laser energy directional modification assembly 392. In the previous embodiments of the invention, the laser energy directional modification assembly 392 was disclosed in the form of a mirror 204. The assembly 392 may also be formed as an optical assembly. FIG. 7 discloses an alternate laser energy directional modification assembly 392 that includes an input lens assembly 396, a wedge prism 397, and an output lens assembly 398. The wedge prism 397 serves to change the direction of the laser energy. The wedge prism 397 provides higher laser energy throughput than is available from a mirror 204.

Preferably, the laser energy is directed toward the receiving surface at a non-orthogonal angle. Prior art devices use a mirror to direct the laser energy to the surface in such a manner that the laser energy impinges upon the surface in an orthogonal manner. In this configuration, reflective laser energy disrupts the incoming laser energy. In addition, a plume and spatter are produced which must be removed by conventional techniques to prevent damage to the optics. When the laser energy is impinged upon the surface 20 to be welded at an angle of say 45°, as shown in FIG. 7, then reflective laser energy does not disrupt the incoming laser energy.

Figure 8:
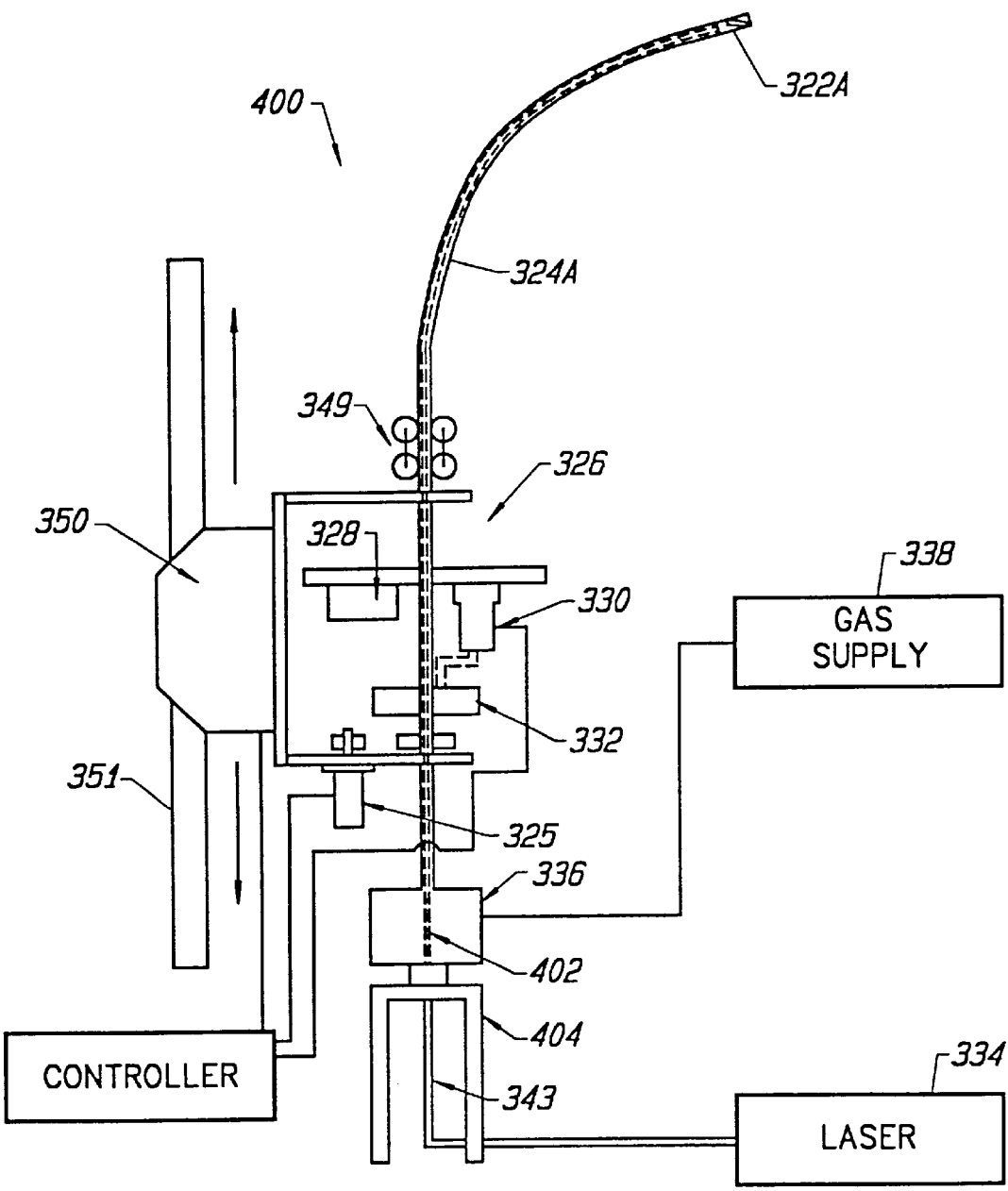
FIG. 8 is a side view of an alternate rotating apparatus utilized in accordance with the present invention.

FIG. 8 depicts another embodiment of the invention. The embodiment of FIG. 8 generally corresponds with the embodiment of FIG. 5, however a fixed interior tube 402 is positioned within the rotating sleeve 324. The fixed interior tube 402 allows a fixed fiber optic cable 343 to remain stationary while the rotating sleeve 324A rotates. In other words, unlike the embodiment of FIG. 5, the fiber optic cable of FIG. 8 does not rotate. Since the fiber optic cable does not rotate, the optic coupler 342 of FIG. 5 is not required. Instead, a fixed interior tube support 404 is utilized.

Figure 9:
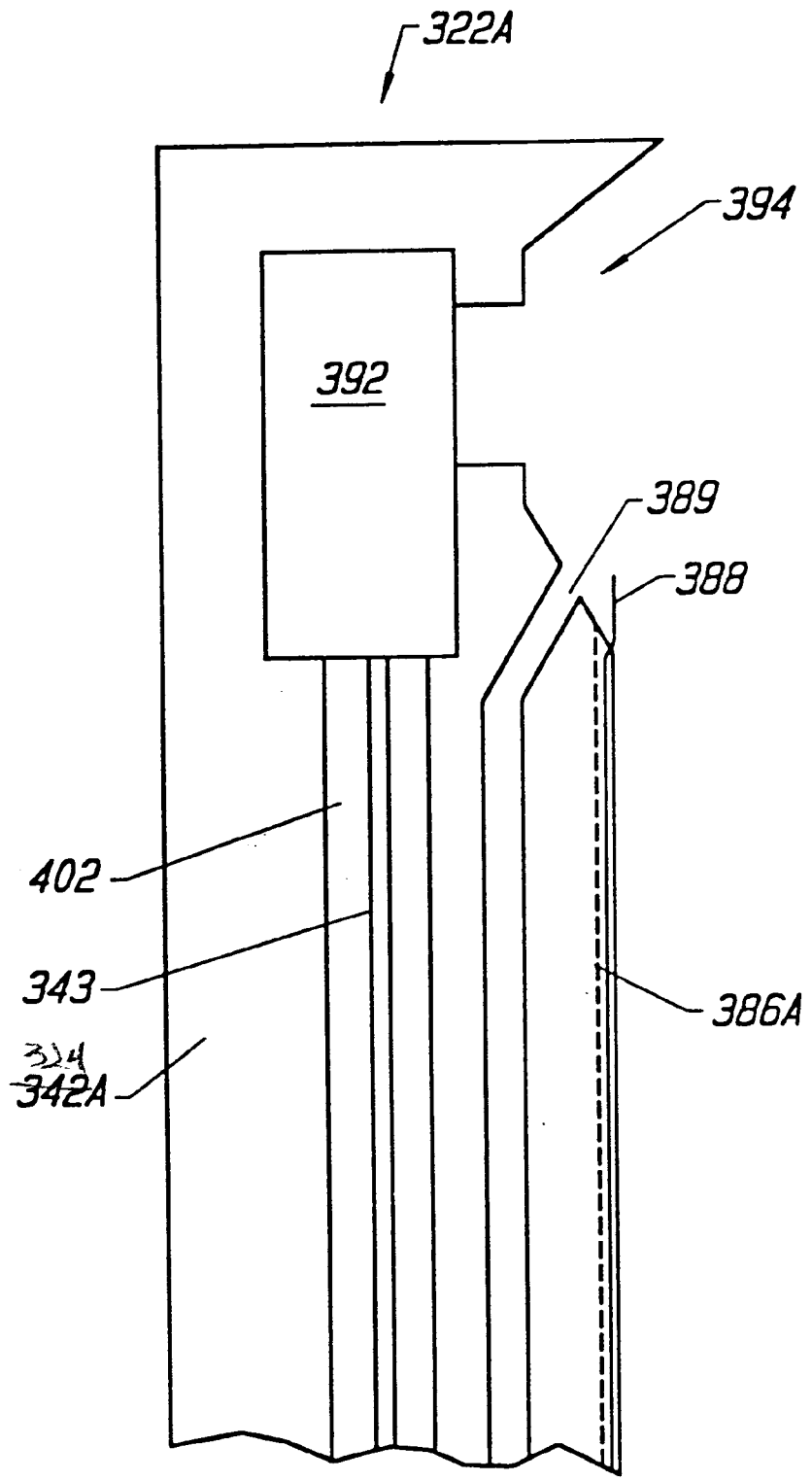
FIG. 9 is a side cross-sectional view of a rotating welding head positioned at the end of the rotating sleeve of the rotating apparatus of FIG. 8.

FIG. 9 illustrates a rotating welding head 322A that may be used with the apparatus of FIG. 8. The figure illustrates a fixed fiber optic cable 343 positioned within a fixed interior tube 402. The rotating sleeve 324A rotates about the fixed interior tube 402. The rotating sleeve 324A includes a gas conduit 389. The rotating sleeve 324A includes a machined groove 386A (shown in phantom) that serves as the filler passage. The filler passage 386A runs the length of the rotating sleeve 324A. The filler passage may also be formed as a small tube running the length of the rotating sleeve 324A. In this embodiment, the laser energy directional modification assembly 392 rotates with the rotating sleeve 324A and receives the laser energy from the stationary fiber optic cable 343.

Figure 10:
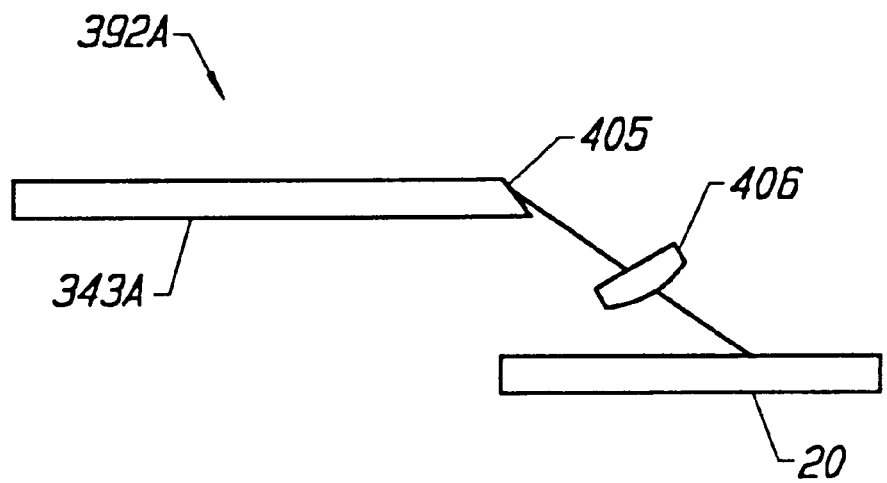
FIG. 10 is a side view of a laser energy directional modification assembly implemented with a cut fiber optic cable.

An alternate embodiment of the directional modification assembly 392A is illustrated in FIG. 10. In this embodiment, the fiber optic cable 343A is beveled at its output end 405 to form a wedge. This structure creates the same effect as the wedge prism illustrated in FIG. 7. This embodiment provides the laser energy directional modification that previously required either a wedge prism or mirror. The laser beam exits the fiber 343A at a non-orthogonal angle and is directed through a focusing lens 406 toward the weld location. A benefit of this design is that it reduces the number of optical elements (i.e., collimating lens, intermediate focusing lens, and wedge prism) and, therefore, reduces the energy losses at each interface and the overall cost of the optical head.

Figure 11:
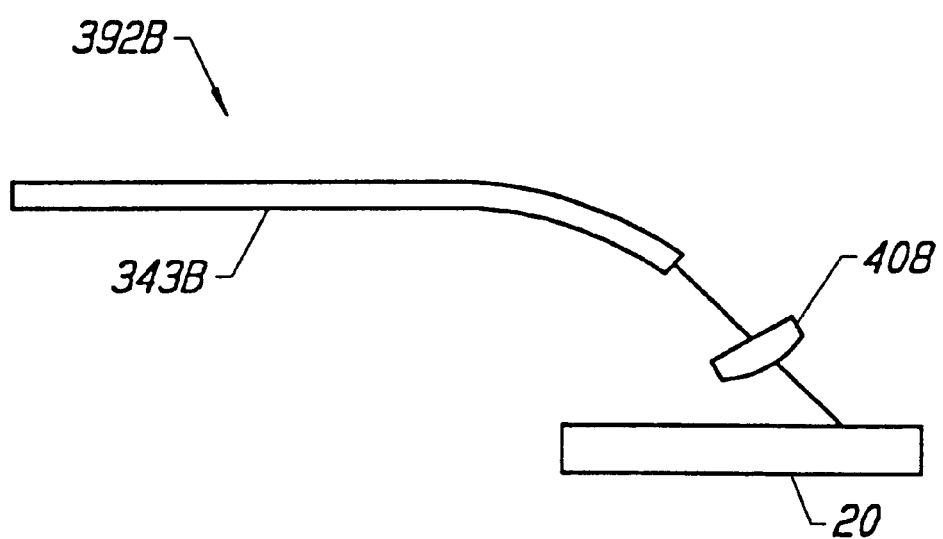
FIG. 11 is a side view of a laser energy directional modification assembly implemented with a bent fiber optic cable.

FIG. 11 illustrates an alternate laser energy directional modification assembly 392B. In this embodiment, the fiber optic cable 343B is bent to obtain a pre-selected non-orthogonal angle relative to the surface 20. The laser energy output from the fiber optic cable 343B is directed through a focusing lens 408 toward the weld location on surface 20. This embodiment of the directional modification assembly eliminates a number of optical elements and thereby reduces energy losses.

The embodiments of FIGS. 5–11 have been implemented using a Hobart 2400 Watt laser with a 1064 nanometer wavelength, from Hobart Laser Products, Inc., Livermore, Calif. The optical cable used in the invention is preferably formed of fused silica fiber encased in a metallic, flexible sheath. The fiber is coated with a reflective coating to prevent surface absorption of the laser beam and to enhance transmission. The optical cable may have a 600–800 micron spot size. The rotating sleeve 324 may be formed of stainless steel or a flexible metallic tubing.

The rotating sleeve 324 has been implemented with a circular sleeve with an outer diameter of 0.5 inches and an inner diameter of 0.370 inches. The filler passage 386 size is governed by the filler wire size. The filler passage 386 size is preferably a few thousandth of an inch greater than the diameter of the wire. Wire diameters commonly utilized include 0.020, 0.025, 0.030, and 0.035.

The gas coupler 336 is held stationary and the sleeve 324 is allowed to rotate freely through the coupler 336. The gas coupler 336 includes O-rings to allow rotation of the sleeve 324, while maintaining gas pressure within the coupler 336. The sleeve 324 has holes in it to allow gas to be transferred from the gas supply 338 to the interior of the sleeve 324. The gas is then delivered to the weld head 322 through gas conduit 389. Instead of using a dedicated gas conduit 389, gaps may be provided between the fiber optics cable 340, wire conduit 386, and sleeve 324.

The rotating apparatus drive mechanism 25 is preferably a stepper motor. The drive mechanism 325 is coupled to the rotating sleeve 324 and the filler assembly 326 by conventional techniques, such as gears or belts.

The axial drive system 350 has been implemented using a stepper motor mounted on a shaft 351. Horizontal or planar motion may be obtained by manually positioning the shaft 351. In the alternative, the shaft 351 may be positioned in a motorized planar movement device (not shown), that allows the rotating apparatus 320 to be positioned at any selected tube 20.

The filler metal delivery system 330 may be of the type used in existing welders. For example, the invention has been implemented using an ASTRO ARC wire feeder, from ASTRO ARC, Inc., Sun Valley, Calif. Slip ring model AC4598 from Litton Poly-Scientific, Blacksburg, Va., has been used to power the filler metal delivery system 330.

The laser energy directional modification assembly 392 of FIG. 7 has been implemented using standard lenses. The input lens assembly 396 collimates the laser light beam to form a collimated beam. The input lens assembly 396 includes a window lens 396A, a −20 mm f.l. lens 396B, and a +10 mm f.l. lens 396C. The wedge prism 397 bends the collimated beam (from 10 to 60 degrees, preferably from 20 to 45 degrees, and most preferably approximately 30 degrees) to form a bent and collimated beam. The bent and collimated beam is conveyed to the output lens assembly 398, which includes a +20 mm f.l. lens 398A and a window lens 398B. The output lens assembly 398 forms a focused and collimated beam of a small diameter with very high energy density. The beam provides maximum thermal energy at the point of welding, thereby melting the filler material and a portion of the base material in a controlled manner. The laser energy directional modification assembly 392 has been used at 2400 Watts continuous output, without failure. Prior art devices using mirrors have generally been limited to laser energies of 1000 Watts.

The fixed interior tube 402 of FIG. 9 is preferably formed of stainless steel. The rotating tube 324A of FIG. 9 is preferably formed of stainless steel. Commercially available Nylon or Teflon® bearings are used between the fixed interior tube 402 and the rotating tube 324A.

Figure 12:
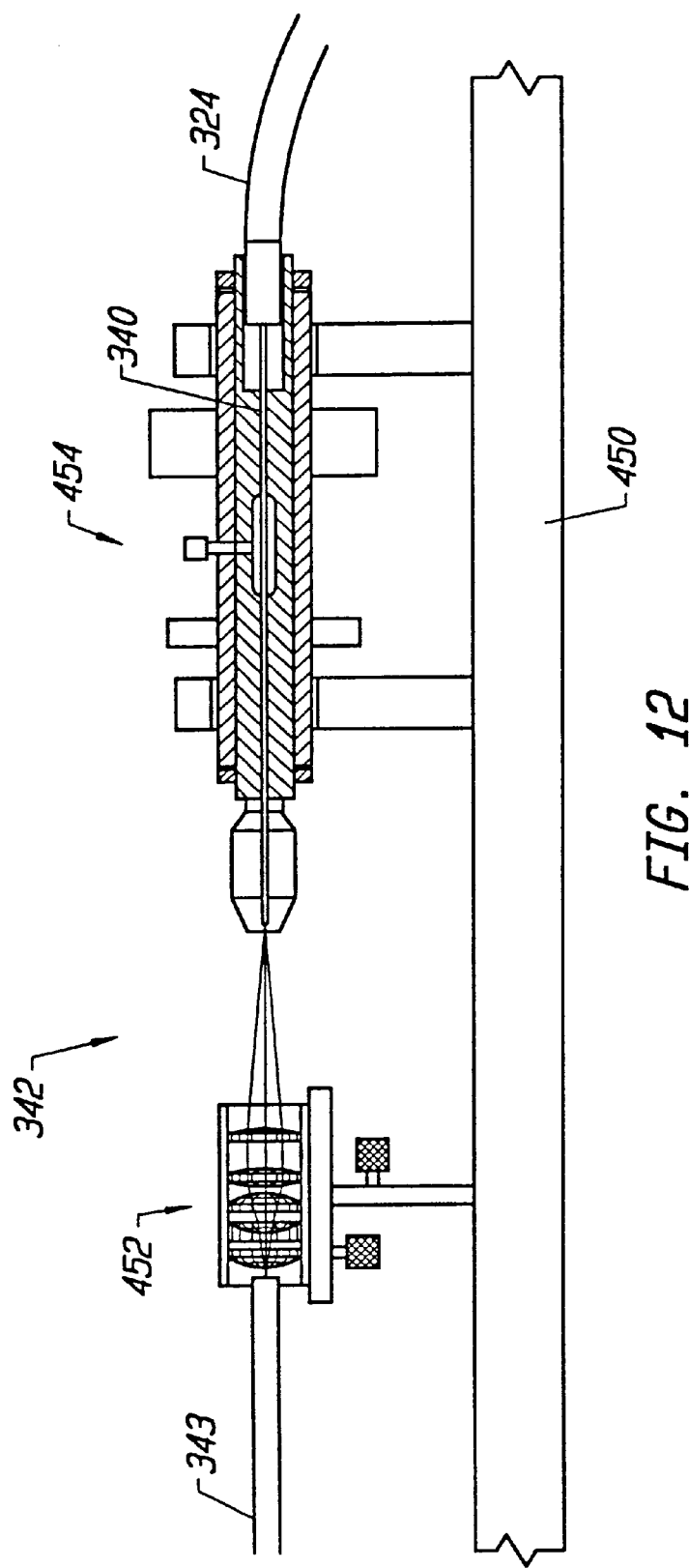
FIG. 12 is a side elevational view of an optical coupler that may be used in accordance with the apparatus of FIG. 5.
Figure 13:
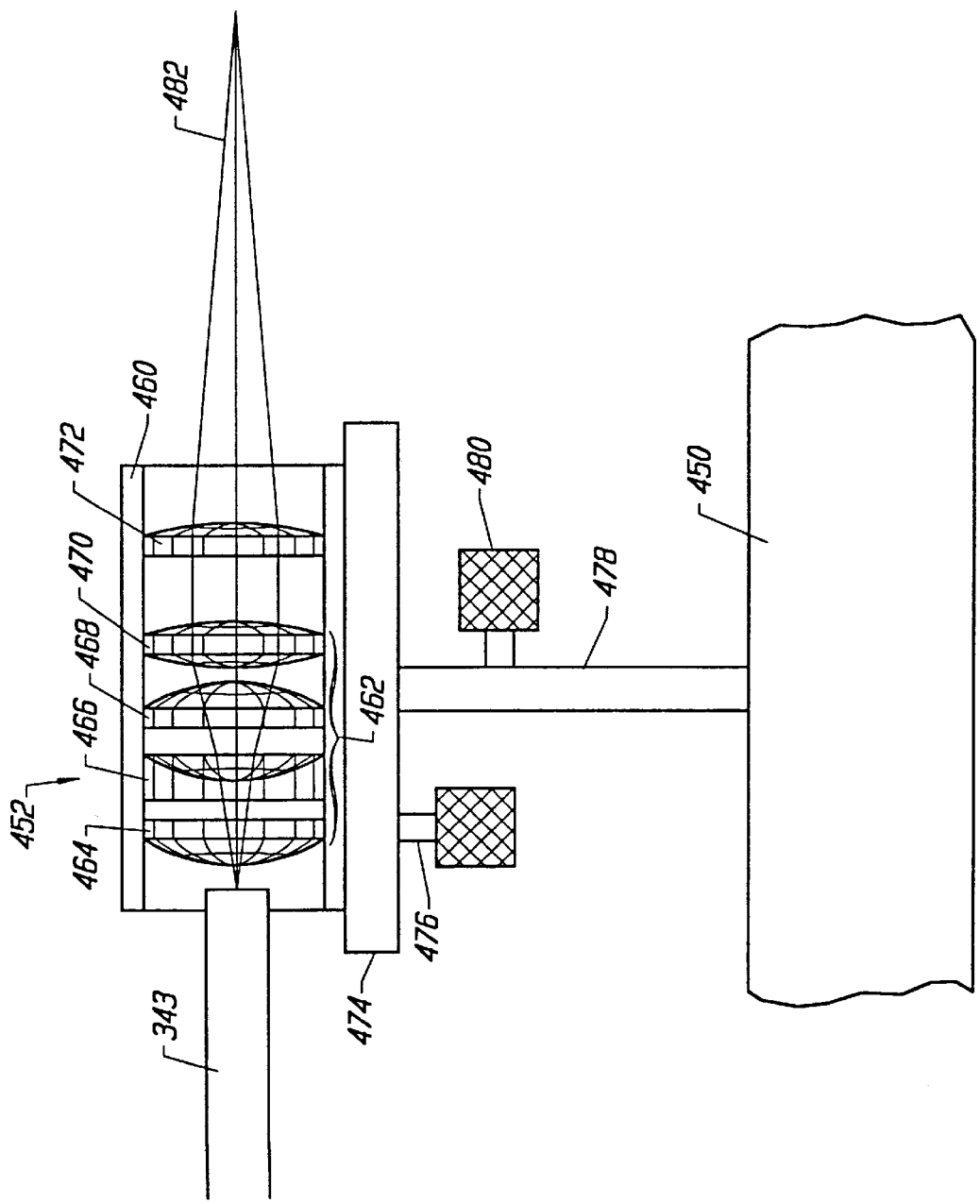
FIG. 13 is an enlarged side elevational view of the fixed optical assembly of the optical coupler of FIG. 12.
Figure 14:
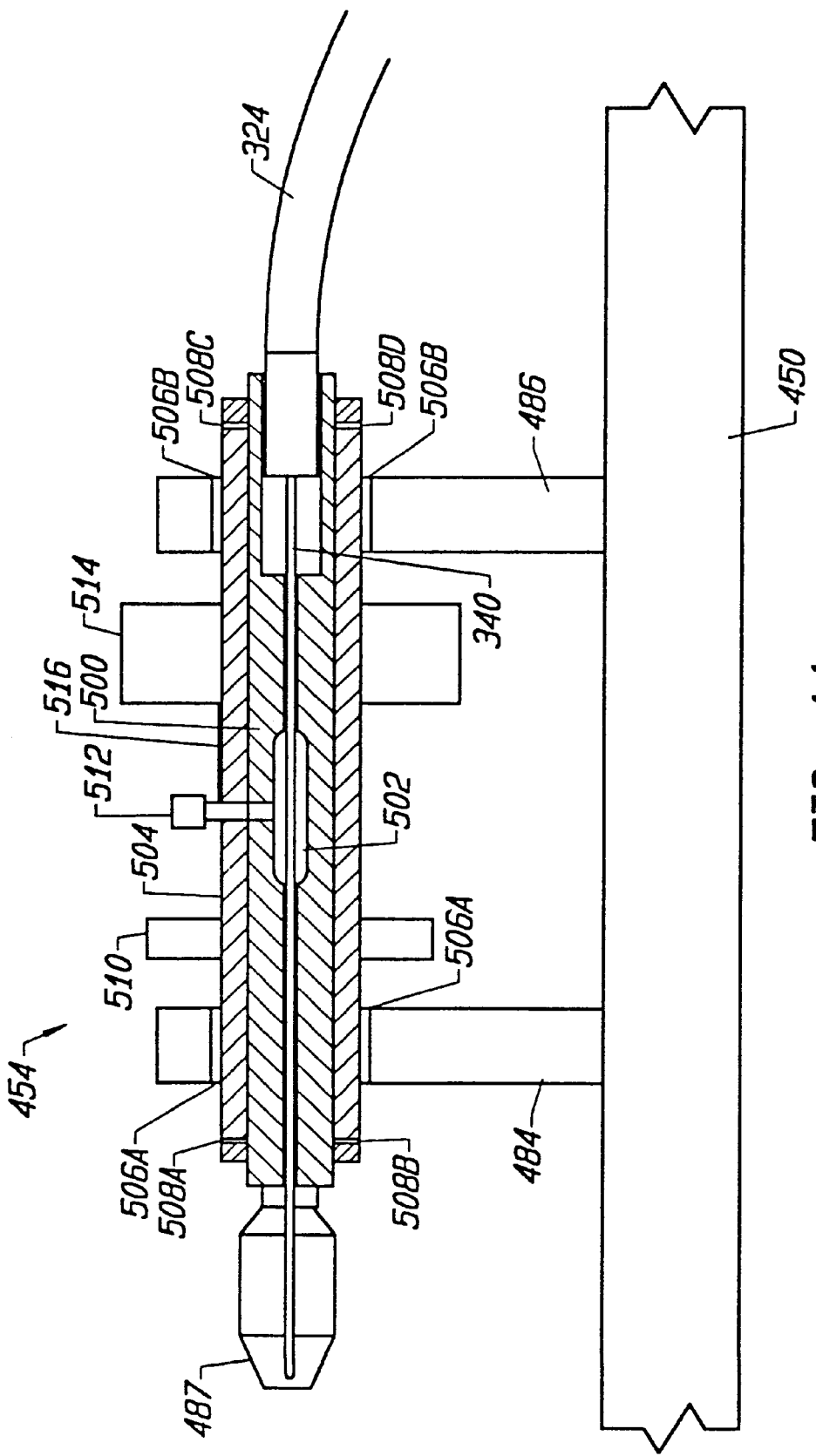
FIG. 14 is an enlarged side elevational view of the rotating cable interface assembly of the optical coupler of FIG. 12.
Figure 15:
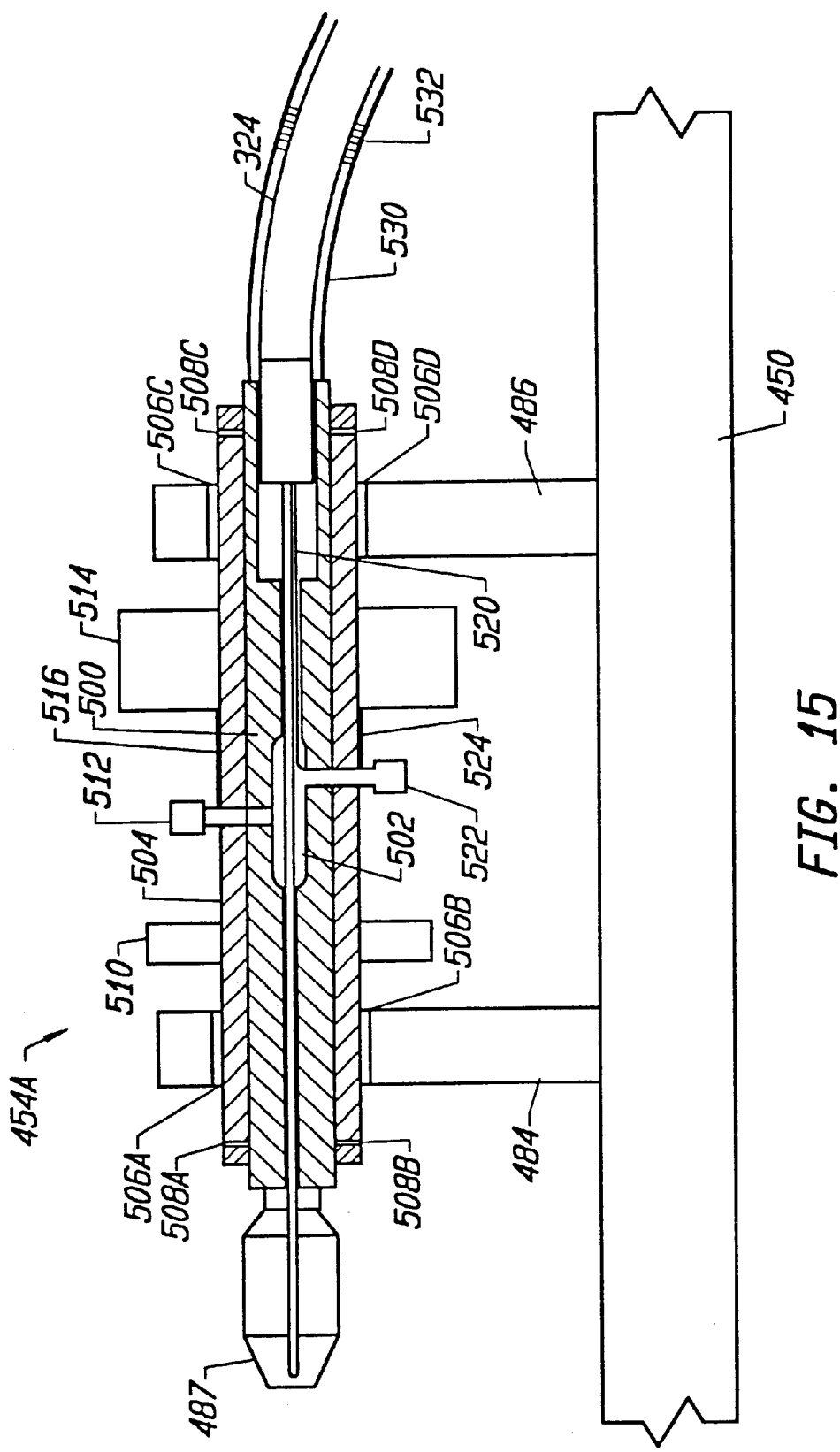
FIG. 15 is an enlarged side elevational view of a rotating cable interface that includes a safety fiber optic and corresponding safety fiber optic photocell.

FIGS. 12–14 illustrate an optical coupler 342 that may be used in accordance with the invention. FIG. 15 illustrates an alternate embodiment of one feature of the optical coupler 342.

As shown in FIG. 12 (see also FIG. 5), the optical coupler 342 provides an interface between the fixed fiber optic cable 343 and the rotating sleeve 324, which encases a rotating fiber optic cable 340. The optical coupler 342 includes a base plate 450 that supports a fixed optical assembly 452 and a rotating cable interface assembly 454.

Attention initially focuses on the fixed optical assembly 452, which is shown in FIG. 13. The fixed optical assembly 452 includes an optical socket assembly 460, which may be implemented as a tube or as a set of independent mounts. Preferably, the fixed optical assembly 452 includes a collimating lens assembly 462, which has a first beam divergence reducing lens 464, a spherical aberration reducing lens 466, a second beam divergence reducing lens 468, and a collimating lens 470. The fixed optical assembly 452 also preferably includes a focusing lens 472. The optics of the fixed optical assembly 452 serve to collimate and focus the light energy of the laser beam 482. As known by those skilled in the art, a variety of optical configurations can be used for this purpose.

The optical assembly 452 preferably includes positioning devices to provide independent axial and concentric alignment. FIG. 13 illustrates an axial mounting stage 474 for the optical socket assembly 460. The axial mounting stage 474 can be positioned with an axial alignment device 476 along the axis defined by the rotating fiber optic cable 340 and the fixed fiber optic cable 343. The axial alignment device 476 may be implemented as a threaded screw that adjusts an axial gear, or an analogous structure, many of which are known to those skilled in the art.

FIG. 13 also illustrates a transverse support 478 that can be positioned along an axis that is transverse to the axis defined by the rotating fiber optic cable 340 and the fixed fiber optic cable 343. A transverse alignment device 480 may be used to reposition the axial mounting stage 474 in the specified transverse (or concentric) direction. The transverse alignment device 480 may be implemented as a threaded screw that adjusts an axial gear, or an equivalent structure.

Turning now to FIG. 14, one embodiment of the rotating cable interface assembly 454 of the invention is illustrated. The focused and collimated laser beam 482 produced by the fixed fiber optical assembly 452 is received by an interface receiving structure 487. Positioned within the interface receiving structure 487 and along the axis of the rotating cable interface assembly 454 is a rotating fiber optic cable 340. The rotating fiber optic cable 340 consists of a fused silica glass monofilament fiber with a silica glass cladding. The rotating sleeve may 324 include a polymer coating, buffer layers, and a protective metallic sheath including a polyethylene cover.

The rotating cable interface assembly 454 includes a first interface support 484 and a second interface support 486, both of which are connected to base plate 450. The first interface support 484 and the second interface support 486 are used to support a mounting sleeve 500, which is surrounded by an alignment tube 504. The alignment tube 504 rotates in a set of bearings 506A and 506B respectively positioned in the interface supports 484 and 486. The alignment tube 504 may be driven by a gear 510. The position of the alignment tube 504 may be adjusted with a set of alignment screws 508A, 508B, 508C, and 508D. In one embodiment of the invention, four alignment screws 508 are provided at each end of the alignment tube 504.

As its name implies, the alignment tube 504 is used to align the position of the optic fiber 340 with the incoming laser beam 482. Preferably, the accuracy of the alignment is measured through the use of a monitor cavity 502 positioned within the mounting sleeve 500. A photocell 512 is optically connected to the monitor cavity 502. The photocell generates a voltage proportional to the amount of light in the cavity 502. The voltage (output) signal is conveyed to a slip ring 514 over a conductor 516. The slip ring is connected to a stationary piece of equipment (not shown), such as a digital volt meter, which provides a signal corresponding to the output of the photocell 512. Proper axial and concentric alignment is achieved when the light level emitted from the fiber optic 340 is at a minimum (and the output of the fiber optic 340 is at a maximum) for all rotational positions. Thus, the alignment screws 508 are adjusted to achieve this result. The axial alignment device 476 and transverse alignment device 480 may be used for course adjustments.

FIG. 15 illustrates an alternate embodiment of a rotating cable interface assembly 454A which may be used in accordance with the invention. This embodiment of the invention includes a safety fiber optic 520. A safety fiber optic 520 monitors reflected light at a welding point. The reflected light is transmitted through the safety fiber 520 to a photocell detector, where it is analyzed. If the monitored light level is inconsistent with normal operation, the laser energy is discontinued. The use of this monitoring device is important to minimize optical damage due to reflected light energy within the optical components.

While the use of a safety fiber 520 is known for a stationary welding device, the present invention incorporates a safety fiber 520 into a rotating welding apparatus. Specifically, the rotating sleeve 324 carries an additional fiber optic 520. The additional fiber optic 520 runs the length of the rotating sleeve 324 and terminates at the rotating welding head 322. At the opposite end of the rotating sleeve 324, the safety fiber 520 terminates at a safety fiber optic photocell 522 positioned, in this embodiment, within the monitor cavity 502. The output signal from the safety fiber optic photocell 522 is relayed over a second conductor 524 to the slip ring 514. The signal from the slip ring may then be analyzed by a stationary piece of equipment, as described in relation to the power transmitting fiber optic 488.

FIG. 15 illustrates that the rotating sleeve 324 may be encased in a non-rotating protective sheath 530. Bearings 532 may be positioned between the rotating sleeve 324 and the non-rotating protective sheath 530. The sheath 530 provides a protective cover to prevent damage and abrasion to the rotating sleeve 324 and the rotating fiber optic cable 340 positioned therein. The sheath 530 also permits an axial drive mechanism to directly grip the sheath 530 so that the rotating fiber optic cable 340 can be positioned at a desired axial location.

Figure 16:
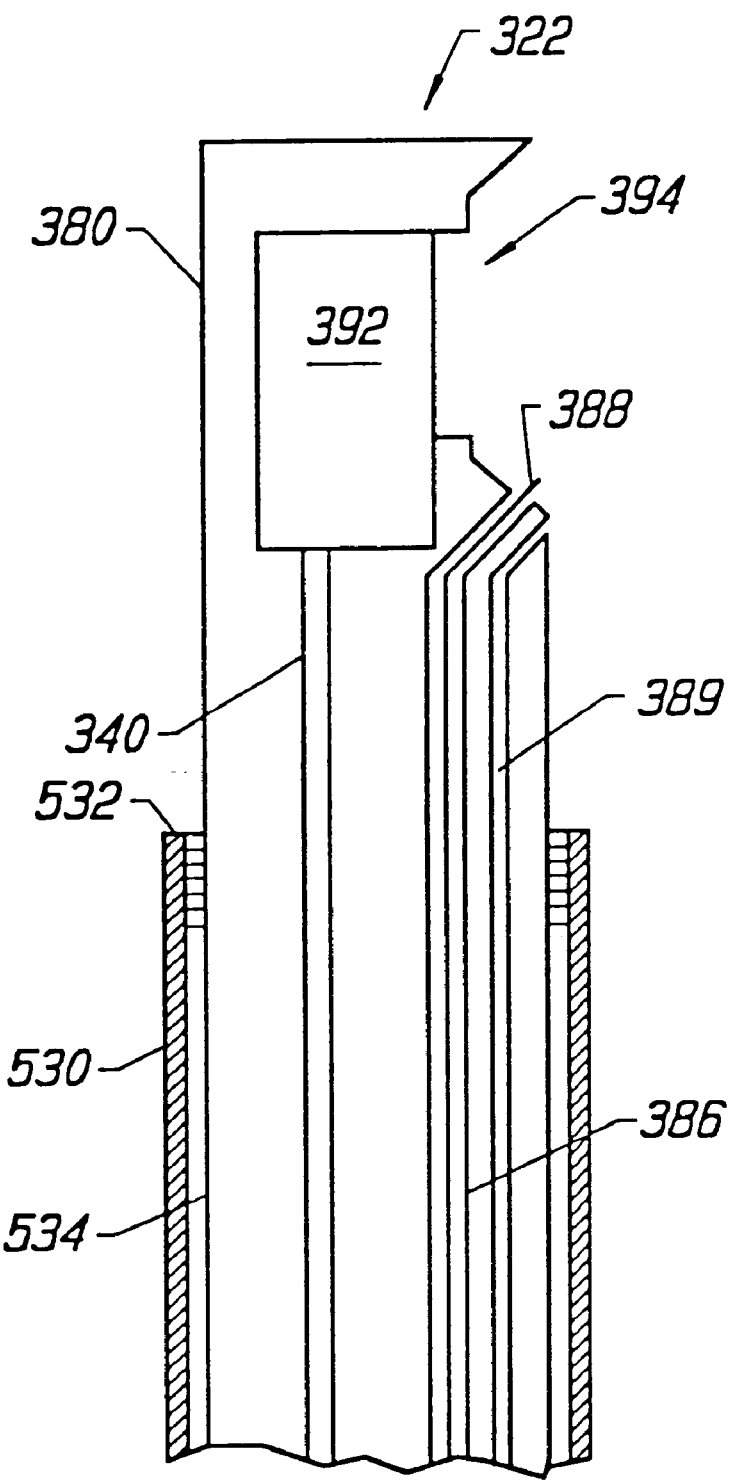
FIG. 16 is a side cross-sectional view of a rotating welding head positioned at the end of the rotating sleeve that includes a non-rotating protective sheath.

FIG. 16 illustrates a rotating welding head 322 encased within a non-rotating protective sheath 530. Bearings 532 are preferably positioned between the rotating welding head body 380 and the non-rotating protective sheath 530.

In a typical embodiment, bearings 532 will be provided in the rotating welding head 322 and approximately every 12 inches along the length of the rotating sleeve 324. In the alternative, a grease or heavy oil lubricant may be used between the rotating sleeve 324 and the non-rotating protective sheath 530. The non-rotating protective sheath 530 may be formed of nylon or plastic with a stainless steel braided reinforcement.

A number of variations of the non-rotating protective sheath 530 are feasible. For example, FIG. 16 illustrates a gas conduit 389. The gas conduit 389 may be eliminated and the gas may be transported through the void 534 defined between the rotating sleeve 324 and the non-rotating protective sheath 530. In this configuration, a delivery head for the gas would be provided at the rotating weld head 322.

Figure 17:
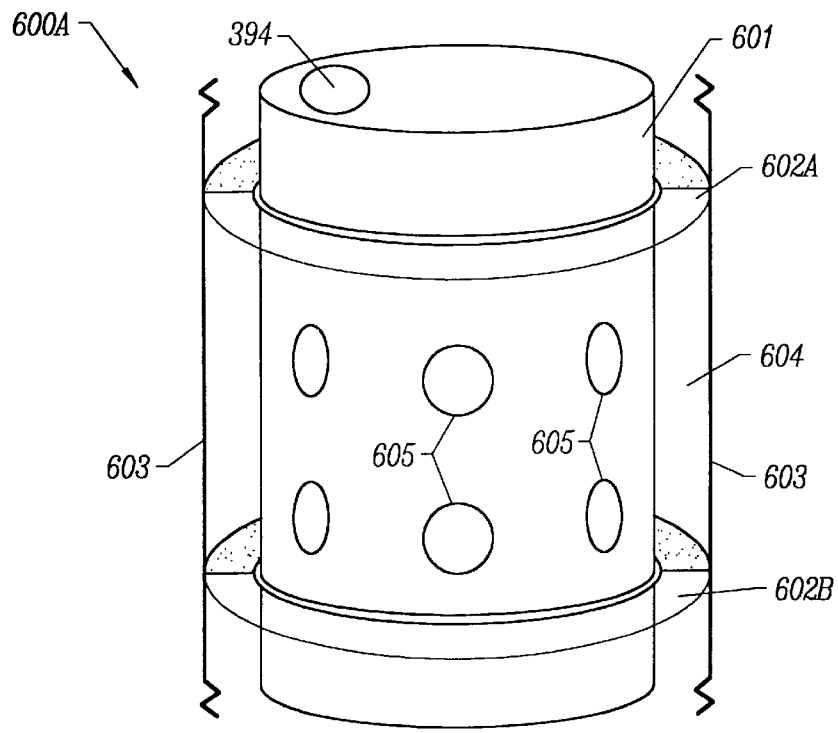
FIG. 17 is a side view of a self-centering laser welding probe in accordance with an embodiment of the invention.

FIG. 17 illustrates a self-centering laser welding probe 600A in accordance with an embodiment of the invention. The self-centering laser welding probe 600A generally corresponds to the previously described weld head 200 and rotating welding head 322, but includes a self-centering feature. The self-centering feature allows for more accurate welding operations. In addition, the self-centering feature allows a single laser welding probe 600 to be used with a variety of tube circumferences. Further, self-centering implementations of the invention can be used with the different rotating apparatus described herein.

FIG. 17 illustrates that the self-centering laser welding probe 600A includes a laser welding probe body 601 including a void 394. The void 394 is of the type previously described in reference to FIGS. 9 and 16. In particular, the void 394 allows laser energy to pass through it so that the laser energy can be used to perform laser welding operations in the manner previously described. The self-centering laser welding probe 600A also includes a set of seals 602A and 602B positioned on the body 601. The seals 602 abut the interior surface of a tube 603, thereby forming a pressure region 604 between the laser welding probe body 601, the interior surface of the tube 603, and the seals 602. As discussed below, the invention may also be implemented without seals 602.

As further described below, a fluid is passed through fluid ports 605 and into the pressure region 64. By definition, a fluid may be a liquid or a gas. In either embodiment, the fluid creates pressure within the pressure region 604 that is equal on all sides of the probe body 601, provided that the probe body 601 is centered within the tube 603. If the probe body 601 is located off-center, then the pressure will increase on the side of the probe body 601 that is located closest to the tube 603. Conversely, the pressure will be reduced in the pressure region 604 on the side of the probe body 601 that is furthest away from the tube wall surface. As a result, the higher pressure region created on one side of the probe body 601 relative to the lower pressure region on the opposing side will force the probe to the center of the tube 603, thus providing equal pressure on all sides. All embodiments of the invention rely upon this basic self-centering pressure principle.

The seals 602 may be implemented with rubber or another substance with elastomeric properties. As shown with embodiments of the invention described below, seals 602 need not be used. Also demonstrated below is the fact that the fluid ports 605 may be formed in a sheath surrounding the laser welding probe body 601. The invention may be used for stationary or rotating embodiments of a laser welding probe.

Figure 18:
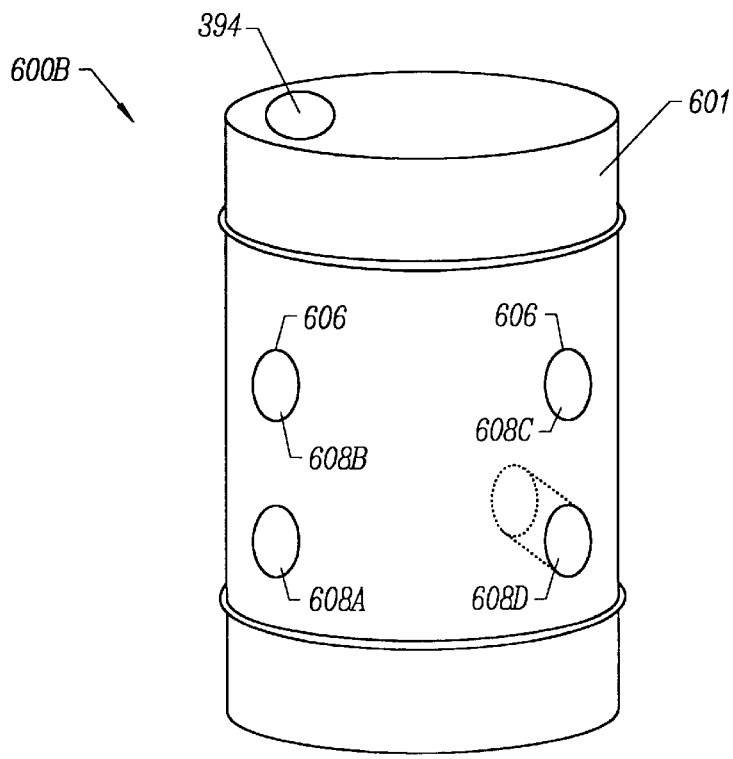
FIG. 18 is a side view of an alternate embodiment of a self-centering laser welding probe in accordance with an embodiment of the invention.

FIG. 18 is a simplified illustration of a "centering ball" embodiment of the invention. In this embodiment, the self-centering laser welding probe 600B includes a laser welding probe body 601 with an aperture 394 of the type previously described. The self-centering laser welding probe 600B includes a set of ball-loaded fluid ports 606. As will be shown below, during a low pressure state, each centering ball 608 rests within a ball-loaded fluid port 606 such that it is within the outer periphery of the body 601 or sheath within which the fluid port 606 is formed. In a high pressure state, each centering ball 608 extends through its respective ball-loaded fluid port 606 and engages the interior surface of the tube. FIG. 18 shows three retracted balls (608A, 608B, and 608C) and one extending ball (608D). In the extended position, the balls migrate to an equivalent pressure, as described in reference to FIG. 17, that coincides with the centering of the laser welding probe body 601 within a tube.

Note that the embodiment of FIG. 18 does not rely upon seals 602. Further note that the embodiment of FIG. 18 is ideal for use with a rotating apparatus since the centering balls 608 freely move within the fluid ports 606.

Figure 19:
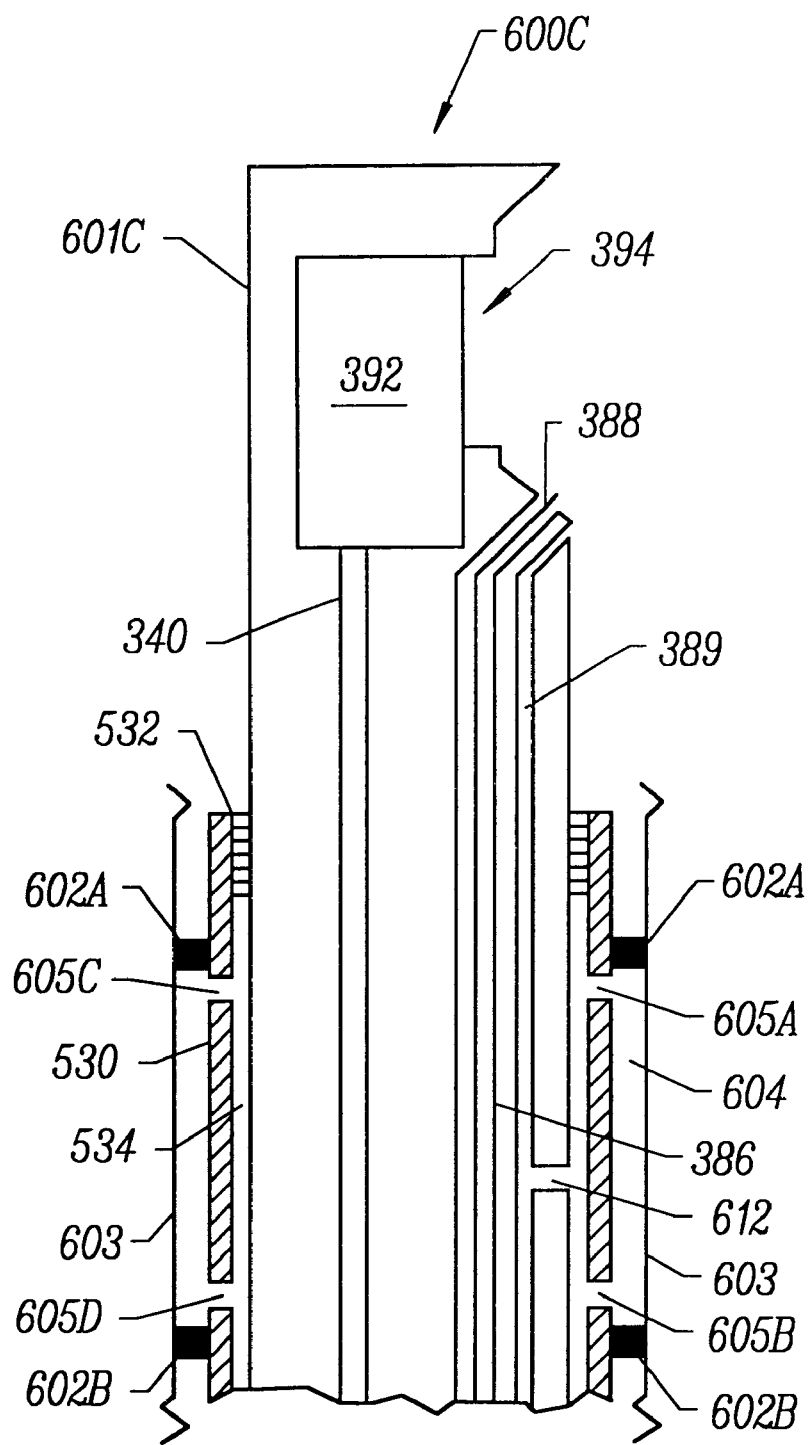
FIG. 19 is a side view of an alternate embodiment of the self-centering laser welding probe in accordance with an embodiment of the invention.

FIG. 19 illustrates a self-centering laser welding probe 600C in accordance with another embodiment of the invention. Note that this embodiment of the invention adds the self-centering functionality to the device of FIG. 16. To achieve this, fluid ports 605 are formed in the non-rotating protective sheath 530. The figure also illustrates that a set of seals 602A and 602B are attached to the sheath 530.

FIG. 19 also shows a fluid conduit in the form of a fluid feed port 612 formed in the laser welding probe body 601C. The fluid feed port 612 is connected to the gas conduit 389. Thus, in this embodiment of the invention, fluid pressure is in the form of gas pressure.

In this embodiment, laser welding probe body 601C is rotating, thus the fluid feed port 612 injects gas in a rotational path. The gas fills the pressure region 604. The gas is also free to go into the void 534 between the sheath 530 and the welding probe body 601C. The gas generates fluid pressure in the manner previously described to keep the probe body 601C centered.

Figure 20:
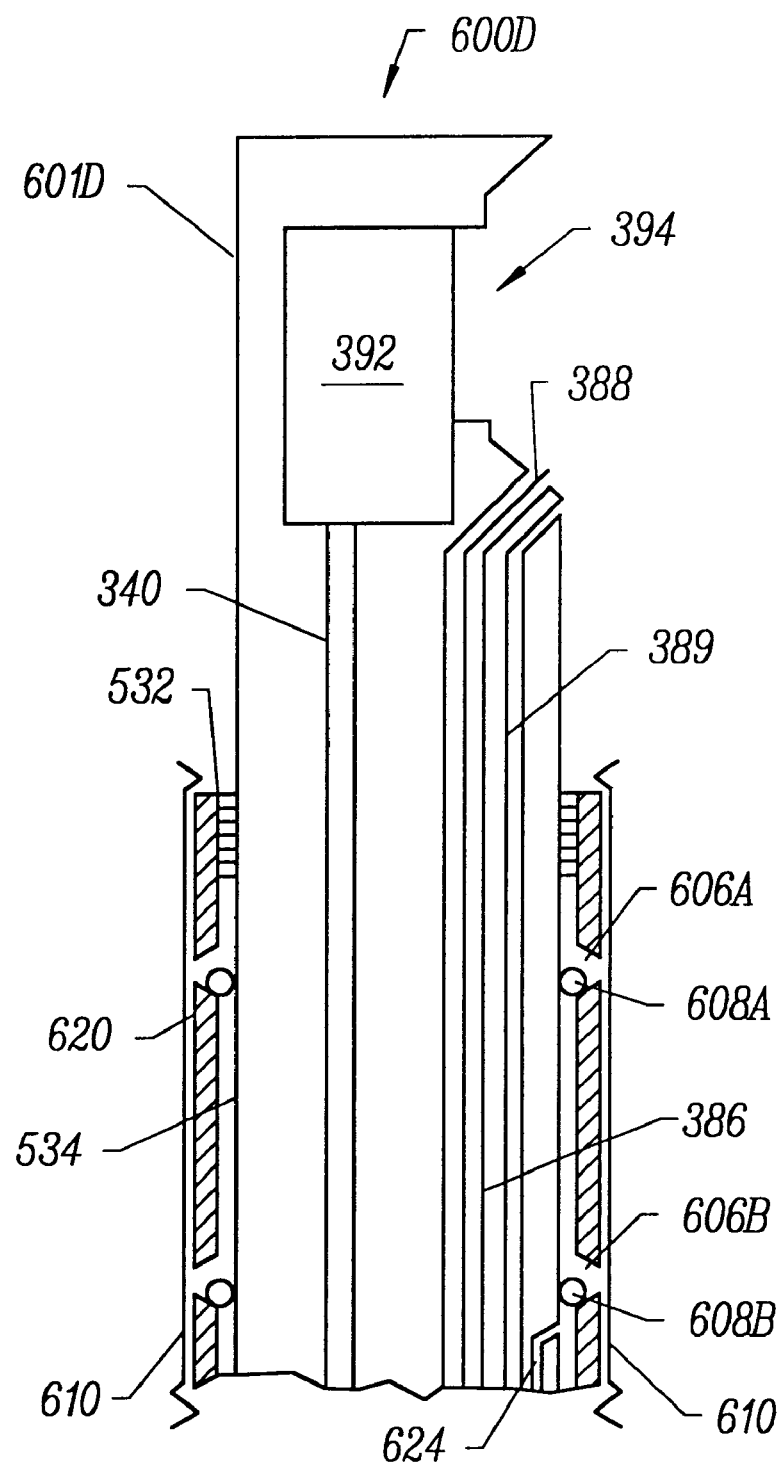
FIG. 20 is a side view of a "centering ball" embodiment of the invention with the centering balls in a retracted position.

FIG. 20 is a cross-sectional view of a "centering ball" embodiment of the invention. In this embodiment of the invention, the laser welding probe body 601D is stationary and a rotating sheath 620 surrounds it. The rotating sheath 620 forms a relatively tight fit in the tube 610. The sheath 620 includes a set of ball-loaded fluid ports 606. Positioned within each port 606 is a centering ball 608. Each centering ball 608 rests against the probe body 601D, thus each centering ball is effectively within the outer perimeter of the sheath 620. A fluid conduit in the form of a fluid passage 624 may be used to inject a fluid into the void 534 formed between the probe body 601D and the sheath 620. Note that this embodiment of the invention does not use seals.

In the embodiment shown in FIG. 20, a relatively low fluid pressure exists, so each centering ball 608 is resting in its respective port 606. In contrast, in FIG. 21, a relatively high fluid pressure is created by injecting fluid through the fluid passage 624. As a result, the centering balls 608 are in an extended position, pushing against the tube 610. Consistent with the previous embodiments of the invention, the relatively high fluid pressure will cause the centering balls 608 to reach equilibrium positions corresponding to a center position of the probe body 601D.

Figure 21:
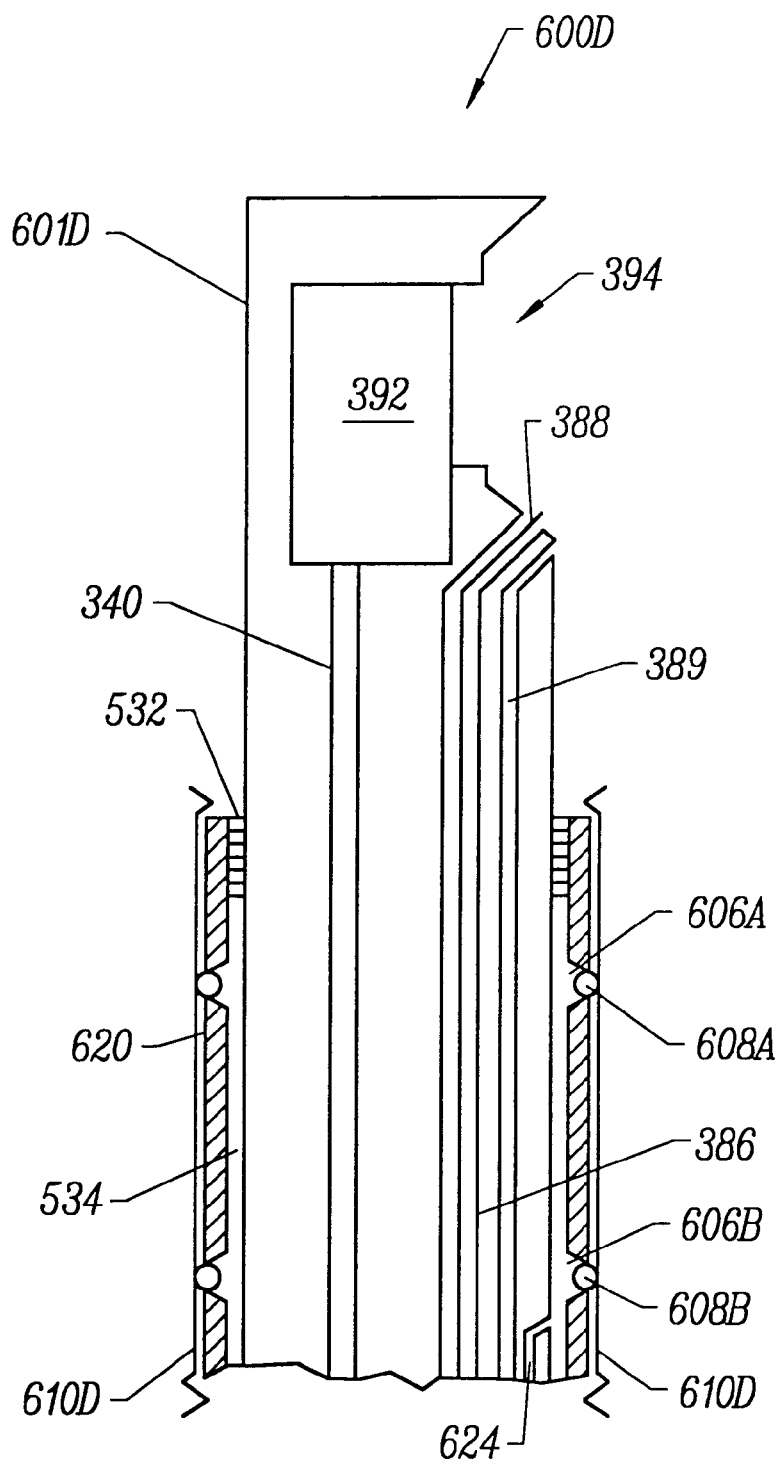
FIG. 21 is a side view of a "centering ball" embodiment of the invention with the centering balls in an extended position.

As shown in FIGS. 20 and 21, the ball-loaded fluid ports 606 have angled surfaces to constrain the balls from exiting the ports 606 in relatively high fluid pressure conditions and to allow the balls to fall against the probe body 601D in relatively low fluid pressure conditions. Retaining rings, set-screws, peened edges, or other well known retention techniques may also be used. An advantage of this embodiment is that it reduces the fluid flow rate necessary for centering of the weld head 601D, since in a relatively high pressure state the balls 608 seal the fluid and therefore fluid does not leak into the annular void between the sheath 620 and the tube 610D. Another advantage of this embodiment is that the balls 608 are free to rotate in any direction, thus they offer relatively low resistance.

The tube 610D in FIG. 21 has a larger circumference than the tube 610 of FIG. 20. Thus, FIGS. 20 and 21 demonstrate how a single probe body 601D can be used with tubes with different circumferences.

The invention provides an efficient technique for centering a laser welding probe body within a tube. This centering operation provides important laser welding accuracy improvements. The technique results in minimal rotational resistance or drag, thus the rotational speed and stability of the laser welding probe system is preserved. Advantageously, a single implementation of the invention can be used with a variety of tube circumferences.

Those skilled in the art will also recognize the numerous benefits associated with the entire apparatus of the invention. In its most basic function, the invention provides a simple and easy method to repair damaged tubes. Thus, the invention allows for the repair of steam generator tubes without requiring significant disassembly of a steam generator. As a result, the invention minimizes the requirement of plugging steam generator tubes and the resultant loss in steam generator capacity.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An apparatus for welding the interior surface of a tube, comprising:
    a laser welding probe body configured for positioning within an interior surface of a tube such that a void exists between at least a portion of said laser welding probe body and said interior surface of said tube; and
    a centering mechanism relying upon gas pressure to substantially center said laser welding probe body within an annular void defined between said laser welding probe body and said interior surface of said tube.

2. The apparatus of claim 1 wherein said centering mechanism includes a set of seals positioned between said laser welding probe body and said interior surface of said tube to define a pressure region between said laser welding probe body, said interior surface of said tube, and said set of seals.

3. The apparatus of claim 2 wherein said laser welding probe body includes a gas conduit to inject gas within said pressure region so as to substantially center said laser welding probe body within said annular void.

4. The apparatus of claim 1 wherein said centering mechanism includes a plurality of centering balls responsive to said gas pressure to substantially center said laser welding probe body within said annular void.

5. An apparatus for welding the interior surface of a tube, comprising:
    a laser welding probe body with a fluid conduit defined therein; and
    a sheath surrounding said laser welding probe body, said sheath being configured for positioning within an interior surface of a tube such that a void exists between at least a portion of said sheath and said interior surface of said tube, said sheath including at least one fluid port to receive a fluid from said fluid conduit, pressure differentials at said fluid port caused by said fluid from said fluid conduit operating to substantially center said laser welding probe body within an annular void defined between said laser welding probe body and said interior surface of said tube.

6. The apparatus of claim 5 further comprising a set of seals positioned between said sheath and said interior surface of said tube to define a pressure region between said sheath, said interior surface of said tube, and said set of seals.

7. The apparatus of claim 6 wherein fluid conduit injects fluid within said pressure region so as to substantially center said laser welding probe body within said annular void.

8. The apparatus of claim 7 wherein said laser welding probe body includes a gas conduit connected to said fluid conduit, said gas conduit conveying a fluid in the form of a gas into said pressure region.

9. The apparatus of claim 5 wherein said sheath includes a plurality of fluid ports with a corresponding plurality of centering balls partially resting therein such that each of said plurality of centering balls is substantially within the outer periphery defined by said sheath.

10. The apparatus of claim 9 wherein said fluid conduit forces fluid against said centering balls causing said centering balls to extend through said fluid ports and engage said interior surface of said tube.

11. A method of welding the interior surface of a tube, said method comprising the steps of:
    positioning a laser welding probe body within the interior surface of a tube such that a void exists between at least a portion of said laser welding probe body and said interior surface of said tube;
    using gas pressure to substantially center said laser welding probe body within an annular void defined between said laser welding probe body and said interior surface of said tube; and
    welding said interior surface of said tube while said laser welding probe body is substantially centered within said annular void.

12. The method of claim 11 wherein said using step includes the step of using gas pressure in a sealed region between said laser welding probe body and said interior surface of said tube.

13. The method of claim 11 wherein said using step includes the step of using gas pressure to force centering balls against said interior surface of said tube and thereby substantially center said laser welding probe body within said annular void.

* * * * *